United States Patent [19]

Wang

[11] Patent Number: 5,539,922
[45] Date of Patent: Jul. 23, 1996

[54] MULTIPLE TREE HIERARCHICAL PORTABLE COMMUNICATION SYSTEM AND METHOD

[75] Inventor: Zhonghe Wang, Lake Worth, Fla.

[73] Assignee: Motorola, Inc., Schaumburg, Ill.

[21] Appl. No.: 130,572

[22] Filed: Oct. 1, 1993

Related U.S. Application Data

[63] Continuation-in-part of Ser. No. 116,746, Sep. 7, 1993, which is a continuation-in-part of Ser. No. 817,018, Jan. 3, 1992, Pat. No. 5,274,845.

[51] Int. Cl.[6] .................................................. H04Q 7/00
[52] U.S. Cl. .................... 455/33.1; 455/54.1; 455/56.1; 340/825.02; 340/825.49
[58] Field of Search ........................ 455/12.1, 13.1, 455/13.2, 33.1, 33.2, 33.3, 33.4, 34.1, 54.1, 54.2, 56.1; 379/59; 340/825.02, 825.44, 825.49

[56] References Cited

U.S. PATENT DOCUMENTS 4,891,638  1/1990  Davis ...................................... 455/34.1
5,274,845  12/1993  Wang ...................................... 455/33.1

Primary Examiner—Curtis Kuntz
Assistant Examiner—Andrew Faile
Attorney, Agent, or Firm—Gregg E. Rasor; Michael J. DeLuca

[57] ABSTRACT

A communication system has a hierarchical system of nodes organized into multiple node trees (800–806, 820–826, and 835), the communication system for completing calls between various ports (810, 812, 826) for interfacing to various transceivers (840). The method used in the hierarchical system is capable of tracking the location of the transceiver as it moves between ports and trees of the system while substantially reducing the size and modification of a data base for tracking the location of the transceiver. The communication system provides a method of linking root nodes (800, 820, 835) of various trees while providing for the advantages of a reduced amount of memory necessary for tracking transceiver movement through the system. The method allows establishment and growth of node trees in various geographic locations while providing for links between the root nodes of the trees.

15 Claims, 20 Drawing Sheets

| LAYER | 5 | 4 | 3 | 2 | 1 |
|---|---|---|---|---|---|
| | COUNTRY | STATE | AREA CODE | CITY | LOCATION |

*FIG.3A*

| LAYER | 5 | 4 | 3 | 2 | 1 | |
|---|---|---|---|---|---|---|
| | U.S.A. | GEORGIA | 404 | ATLANTA | X | CURRENT ADDRESS |
| | U.S.A. | FLORIDA | 407 | BOYNTON BEACH | Y | HOME ADDRESS |

*FIG.3B*

| | |
|---|---|
| HA1 | ADD1 |
| HA2 | ADD2 |
| HA3 | ADD3 |
| HA4 | ADD4 |

*FIG.4*

MULTIPLE TREE HIERARCHICAL PORTABLE COMMUNICATION SYSTEM AND METHOD

This a continuation-in-part of application Ser. No. 08/116,746, filed Sep. 7, 1993 which is a continuation-in-part of application Ser. No. 07/817,018, filed Jan. 3, 1992, now U.S. Pat. No. 5,274,845.

FIELD OF THE INVENTION

This invention generally relates to communication systems for portable transceivers, and particularly to location tracing of portable transceivers.

BACKGROUND OF THE INVENTION

A universal personal communication system is a system enabling anyone to communicate instantly with anyone else anywhere in the world. One of the crucial problems of such a system would be locating millions of moving customers in an efficient manner. The existing techniques for locating moving customers in the system are paging and registration using a central database. Considering the large number of customers in a global system, the first technique, if applied without knowledge of the location of the customers is impractical. The registration technique, which records all the movements of customers in a central database, is also impractical because the task of keeping track of such a huge number of users would be immense. Thus, a need exists for a system for efficiently tracking customers in a universal personal communication system.

Furthermore, frequency spectrum reuse is maximized by providing a communication system with cells as small as possible. However, for a moving customer, movement from cell to cell can cause extensive updating of a location data base.

Additionally, communications systems such as a personal communication systems (PCS) having small cells coupled through a hierarchy of nodes must co-exist with existing communication systems during its establishment. The initial establishment of a complete hierarchy of nodes including national and global nodes may not be possible at the initial introduction of the system in some cases. Thus, what is needed is a method for connecting calls between developed hierarchical trees of the communication system when the trees are not related by hierarchical nodes.

SUMMARY OF THE INVENTION

In accordance with a preferred embodiment of the present invention, method within a communication system for locates a portable transceiver. The communication system has a multiplicity ports for transferring communication information through the communication system between a plurality of transceivers, each of the plurality of transceivers being coupled to one of the multiplicity of ports. Additionally, a multiplicity of nodes transfer information between the multiplicity of ports, wherein each of the multiplicity of ports is uniquely coupled to one of the multiplicity of nodes, and each of the multiplicity of nodes has a memory capable of storing data indicative of a port to which the transceiver is coupled. Furthermore, a plurality of node trees comprise the multiplicity of ports and the multiplicity of nodes. Each of the plurality of node trees has a plurality of the multiplicity of ports, and a plurality of the multiplicity of nodes structured as a hierarchical system of nodes. Wherein, a root node is structured as a highest node in the hierarchical system of nodes, and wherein the plurality of node trees includes a home tree associated with the transceiver, the transceiver having an address indicative of a home port of the home tree, and the plurality of node trees further includes, and a second tree having a second port. The method comprises the steps of coupling the second port to the transceiver and adding a first data entry to a root node of the home tree in response the coupling, the first data entry being associated with the transceiver and indicative of a root node of the first tree.

BRIEF DESCRIPTION OF THE DRAWINGS

FIGS. 1 through 10 show a first preferred embodiment of the invention.

FIG. 1 is a hierarchical structure for a communication system in accordance with the invention.

FIG. 2 is a flow chart of a process carried out at a node for locating a portable communication unit in accordance with the invention.

FIG. 3 is a possible address structure in accordance with the invention.

FIG. 4 is a possible database of a node at layer k.

FIG. 5 is an example of an address chain for a customer of class 5 or 6, before moving.

FIG. 6 is a flow chart for nodes receiving a message M1.

FIG. 7 is a flow chart for nodes receiving a message M2.

FIG. 8 is a flow chart for nodes receiving a message M3.

FIG. 9 is a flow chart for nodes receiving a message M4.

FIG. 10 is an example of an address chain after moving for a customer of class 5 or 6.

FIG. 11 shows each type of transceiver usable in accord with the second embodiment of the present invention, along with a communication card for use with each transceiver.

FIG. 12 shows an example of a communication system operating in accordance with the second embodiment of the present invention.

FIG. 13 shows a data base entry for a transceiver entry stored in the memory of a node in accordance with the second embodiment of the invention.

FIG. 14 shows the structure of "M" messages communicated within the communication system operating in accordance with the second embodiment of the present invent.

Figure 15:
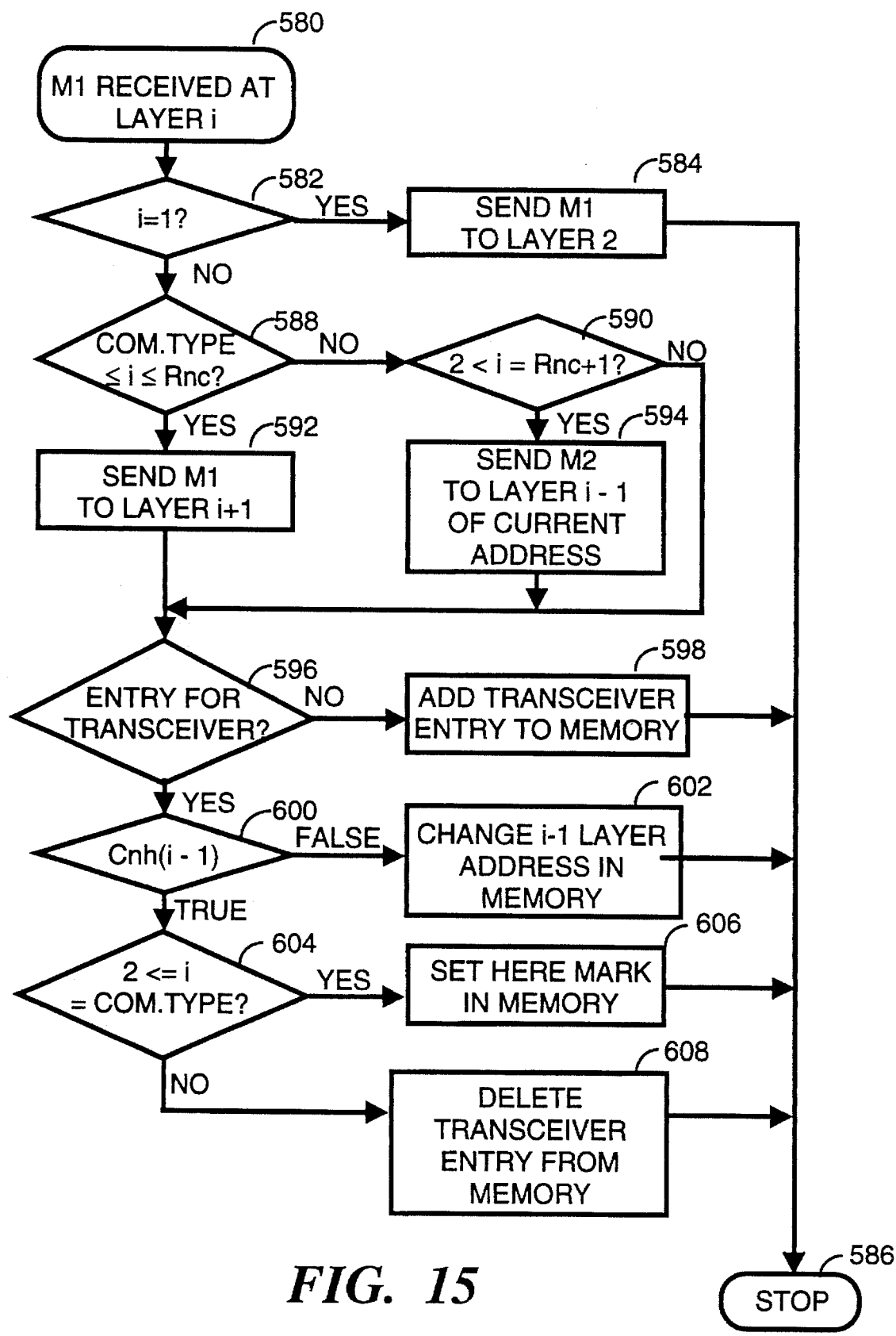

The flowchart of FIG. 15 shows the response of the nodes and ports in the communication system operating in accordance with the second embodiment of the present invention to a M1 message.

Figure 16:
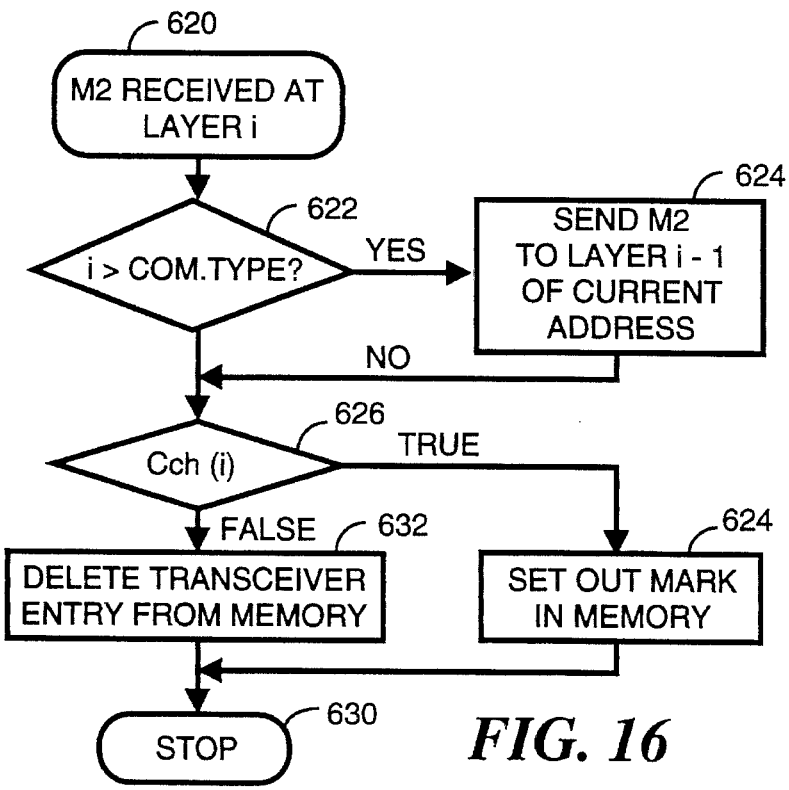

The flowchart of FIG. 16 shows the response of the nodes and ports in the communication system operating in accordance with the second embodiment of the present invention to a M2 message.

Figure 17:
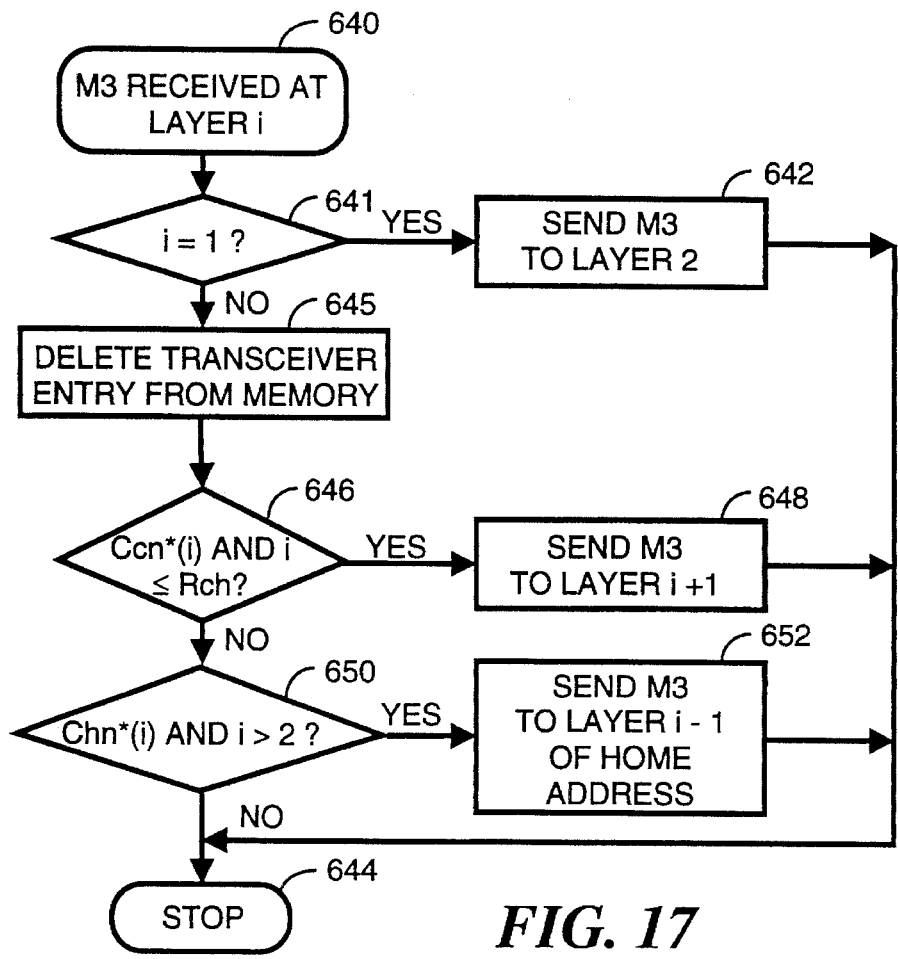

The flowchart of FIG. 17 shows the response of the nodes and ports in the communication system operating in accordance with the second embodiment of the present invention to a M3 message.

Figure 18:
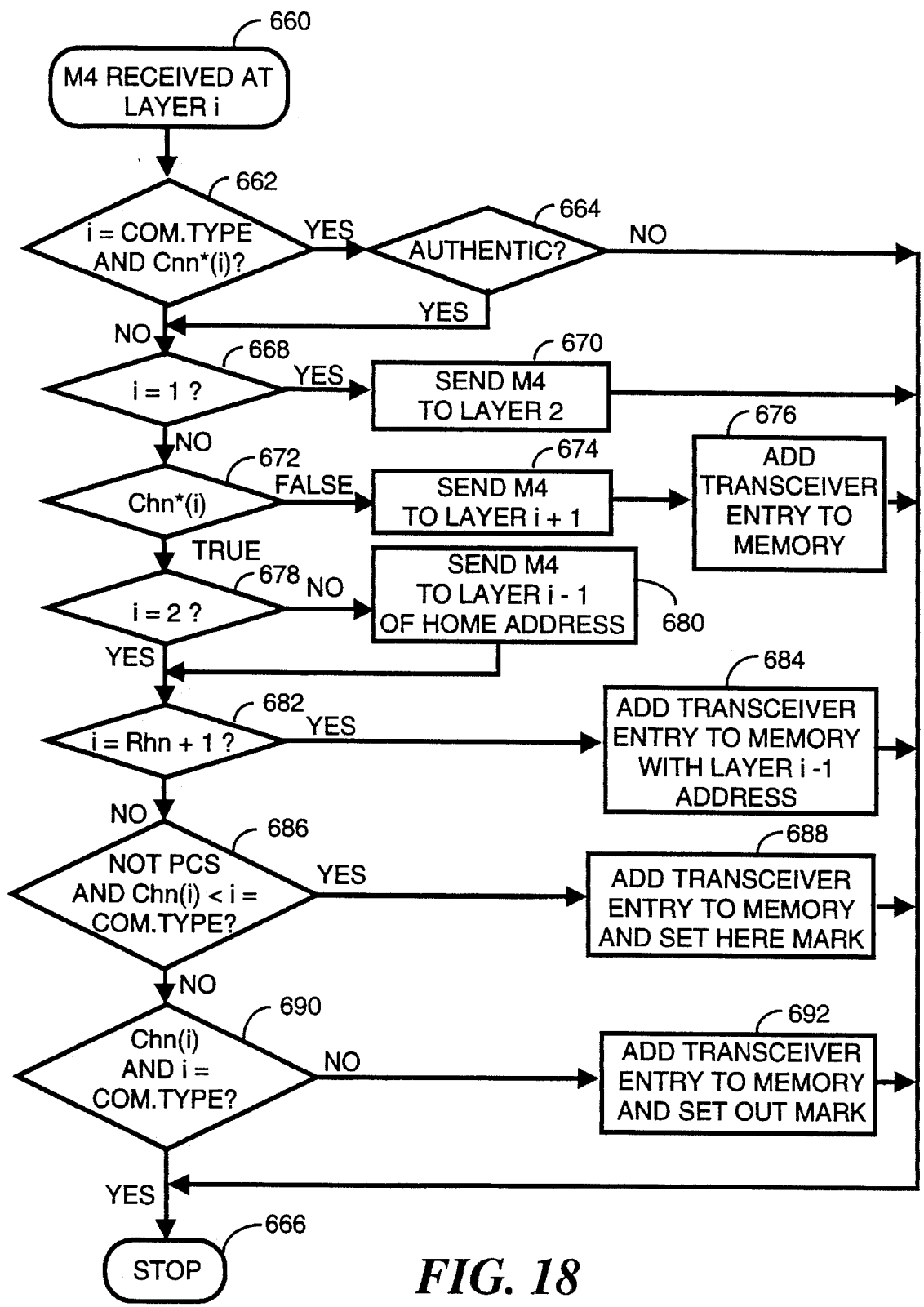

The flowchart of FIG. 18 shows the response of the nodes and ports in the communication system operating in accordance with the second embodiment of the present invention to a M4 message.

Figure 19:
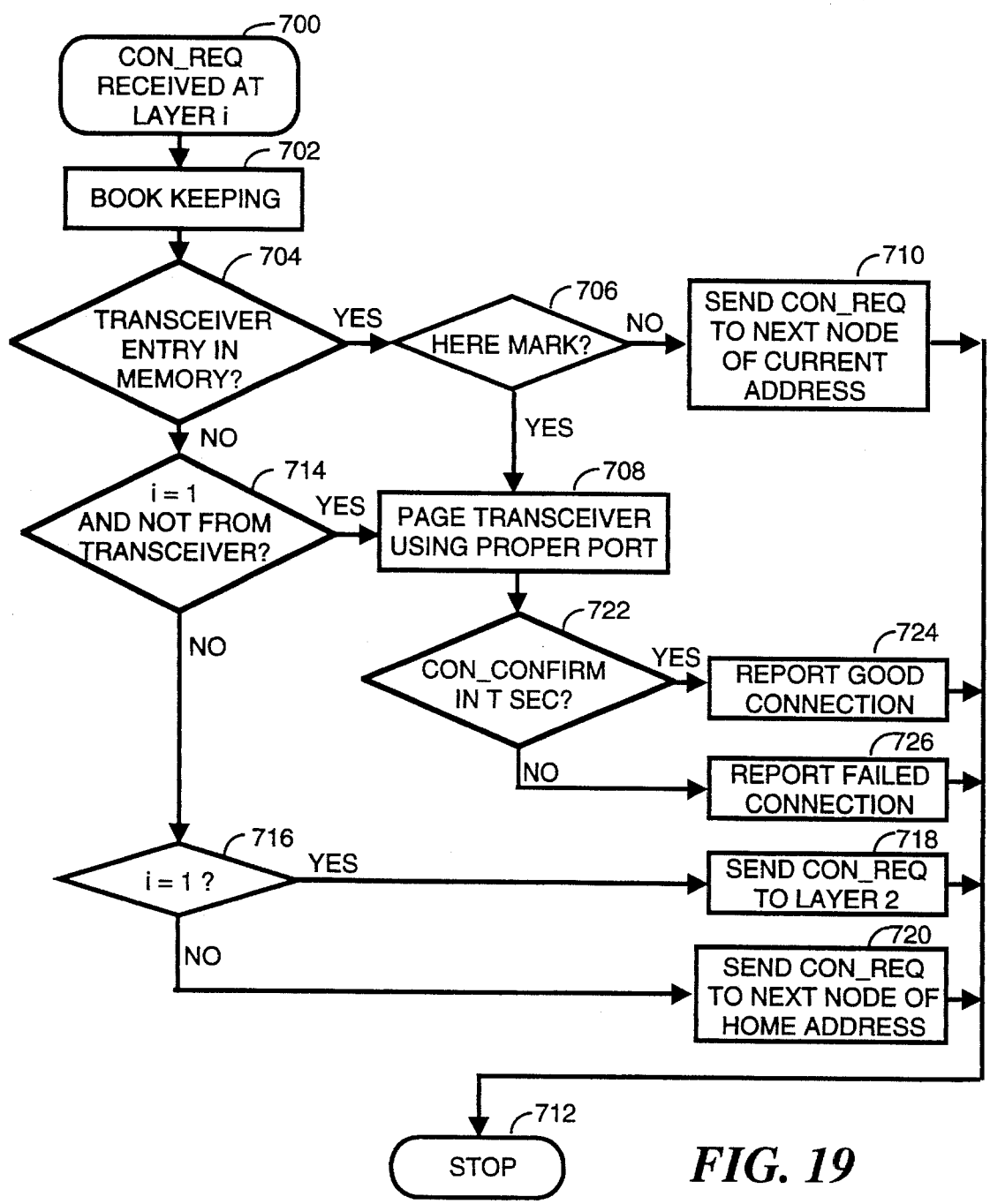

The flowchart of FIG. 19 shows the response of the nodes and ports in the communication system operating in accordance with the second embodiment of the present invention to a connection request caused by the initiation of a call to or from a customer.

Figure 20:
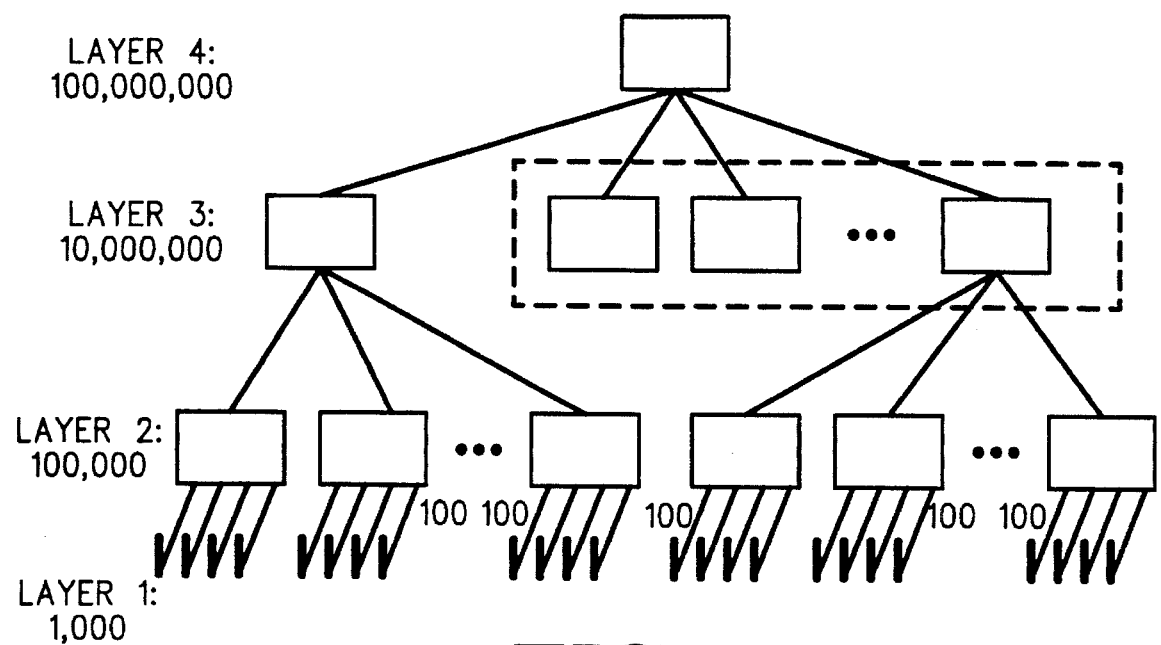

FIG. 20 shows a example for determining the data base efficiency of a communication system operating in accordance with either the first or second embodiment of the present invention.

Figure 21:
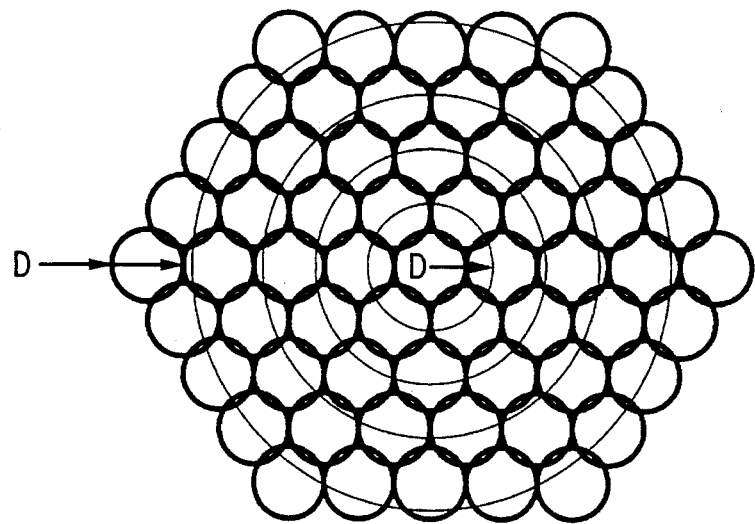

FIG. 21 shows the model used to calculate the mean message distances in accordance with either the first or second embodiments of the present invention.

FIGS. 22 through 25 show a modification to the first and second preferred embodiments to form a third preferred embodiment of the invention.

Figure 22:
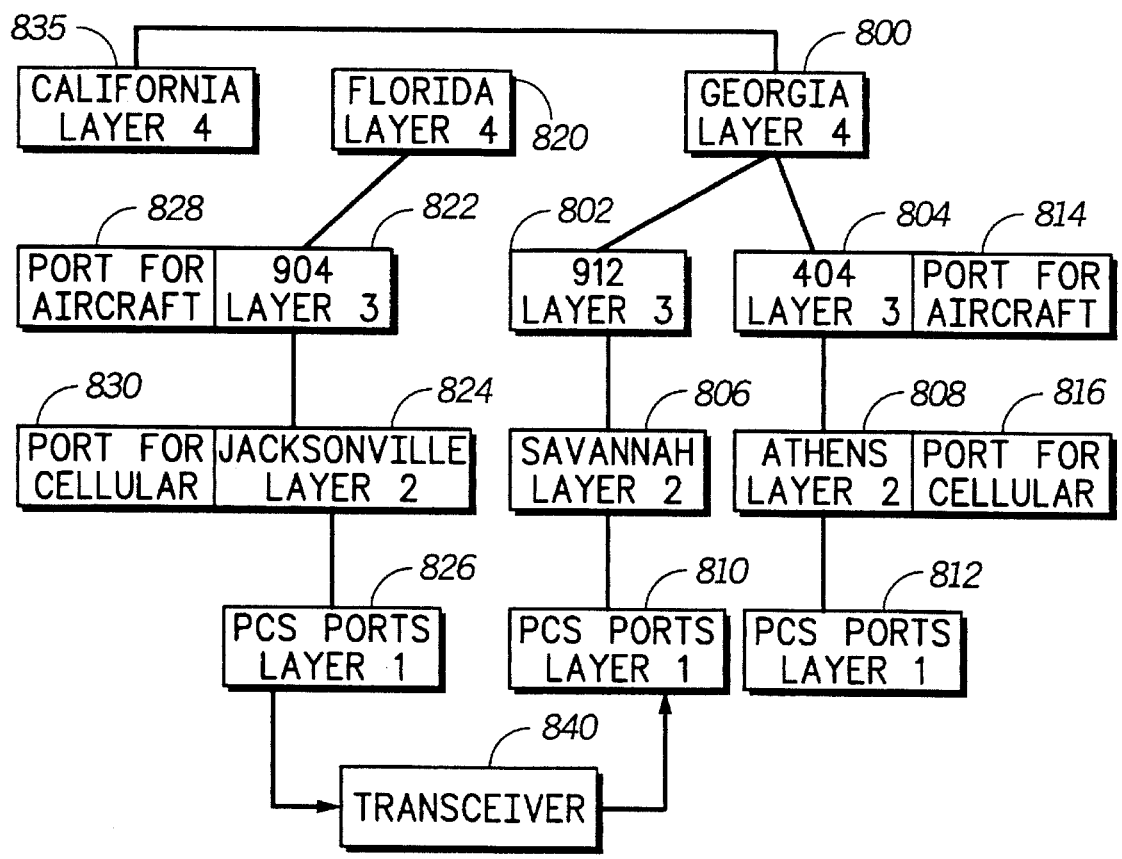

FIG. 22 shows a hierarchical communication system having multiple trees in accordance with a third embodiment of the present invention.

Figure 23:
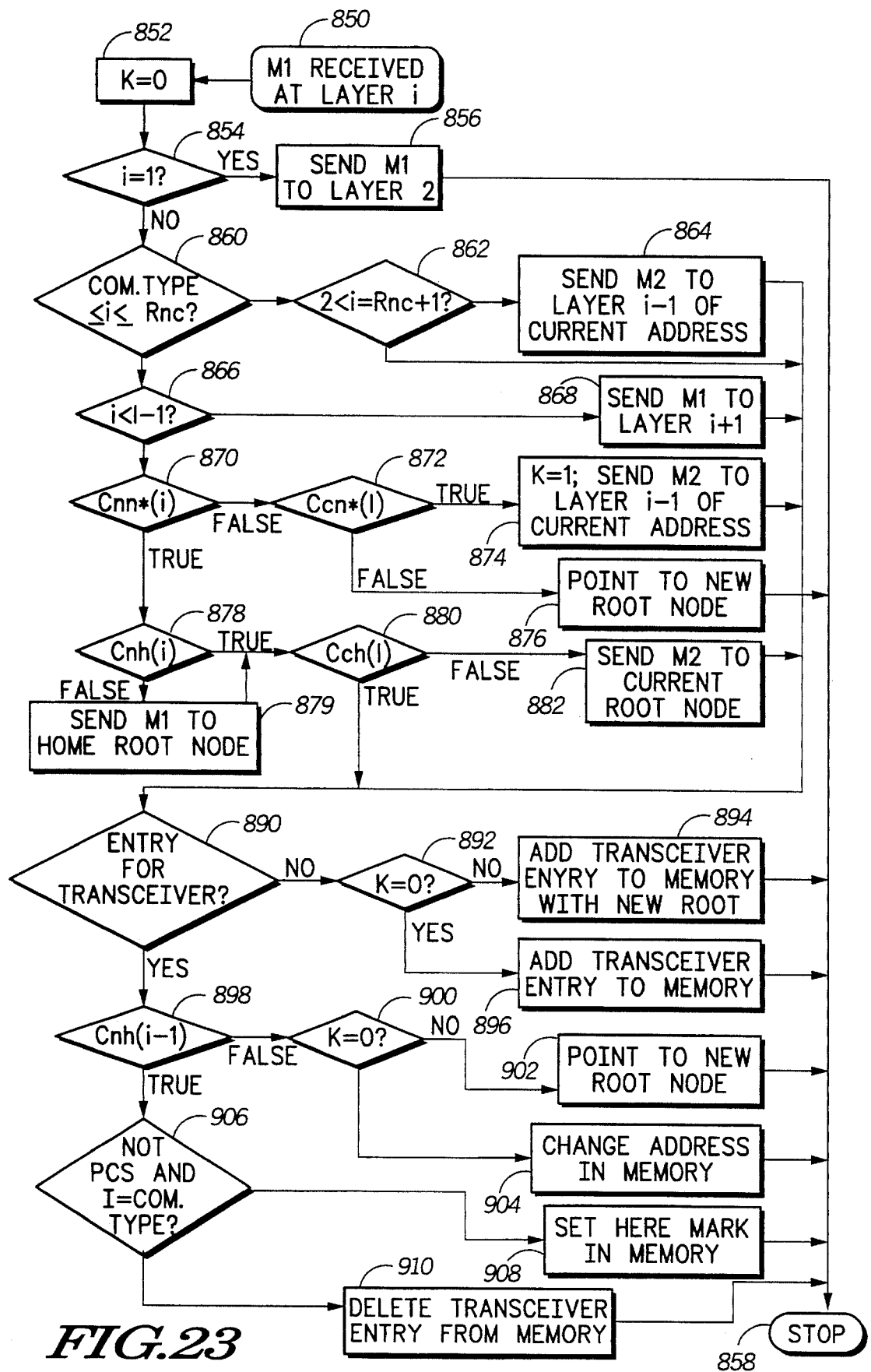

FIG. 23 shows a flowchart of the response of the nodes and ports in the communication system operating in accordance with the third embodiment of the present invention to a M1 message.

Figure 24:
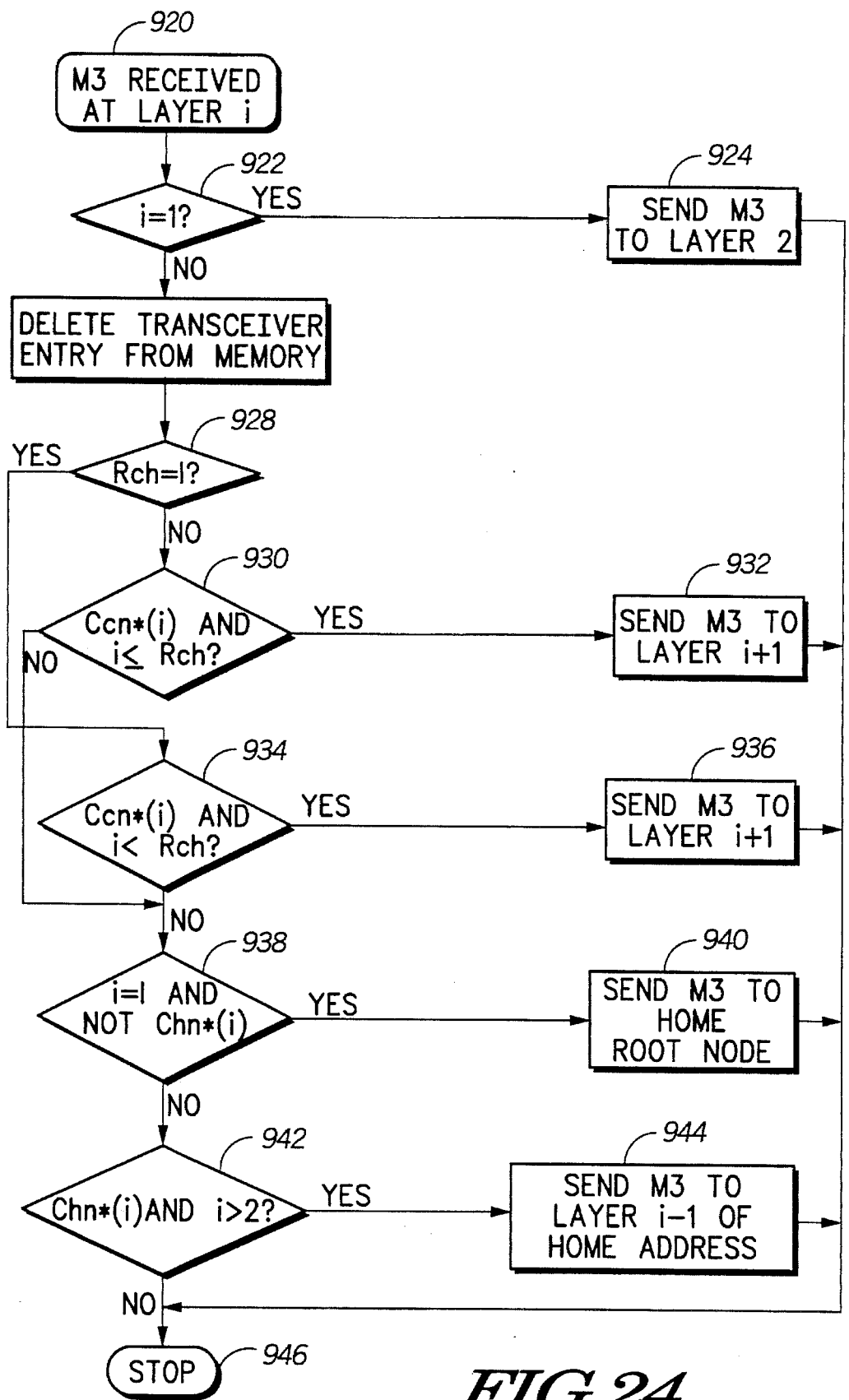

FIG. 24 shows a flowchart of the response of the nodes and ports in the communication system operating in accordance with the third embodiment of the present invention to a M3 message.

Figure 25:
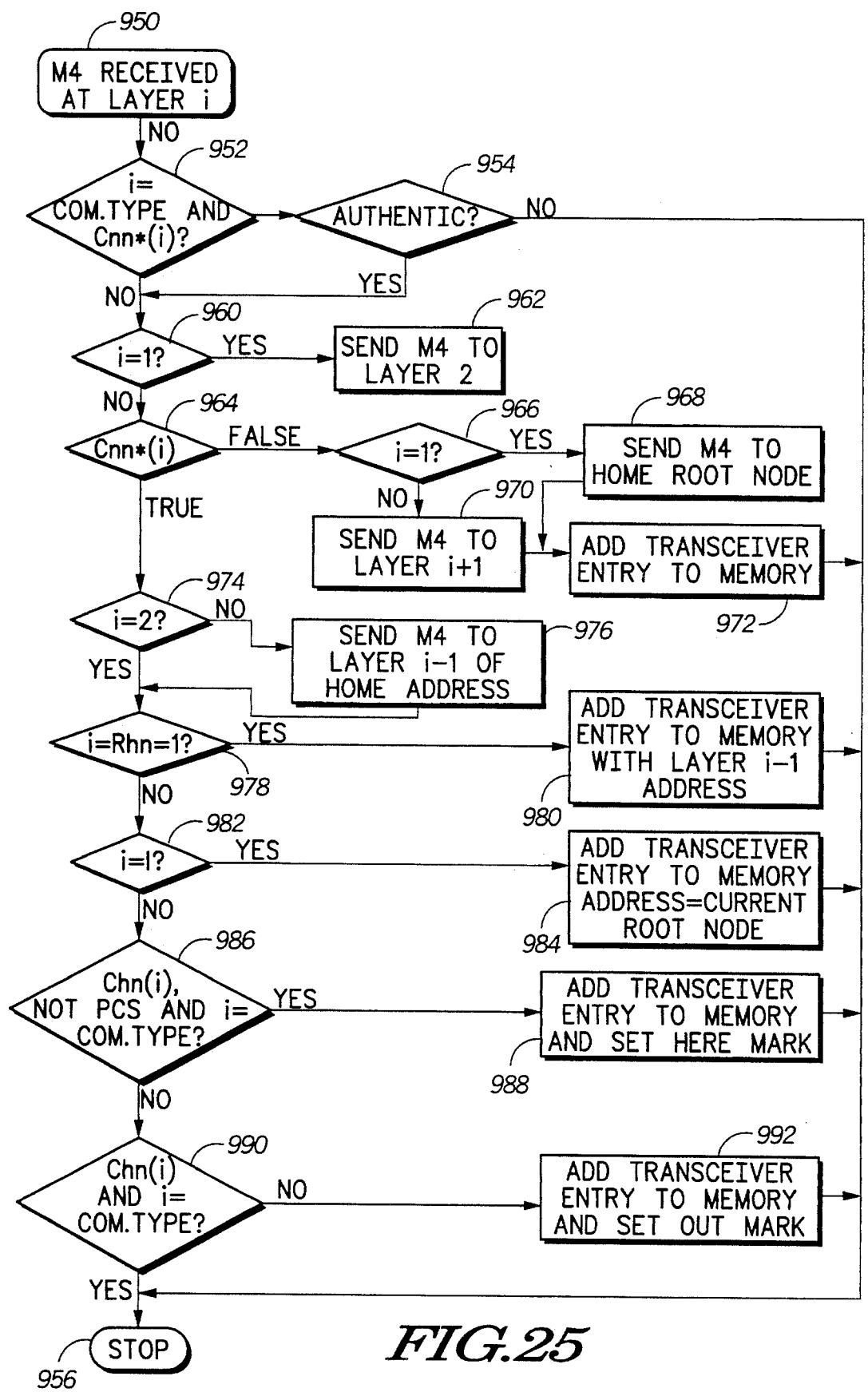

FIG. 25 shows a flowchart of the response of the nodes and ports in the communication system operating in accordance with the third embodiment of the present invention to a M4 message.

DESCRIPTION OF THE INVENTION

The invention is described in terms of a first, second and third embodiment.

I. DESCRIPTION OF A FIRST EMBODIMENT OF THE INVENTION

Figure 1:
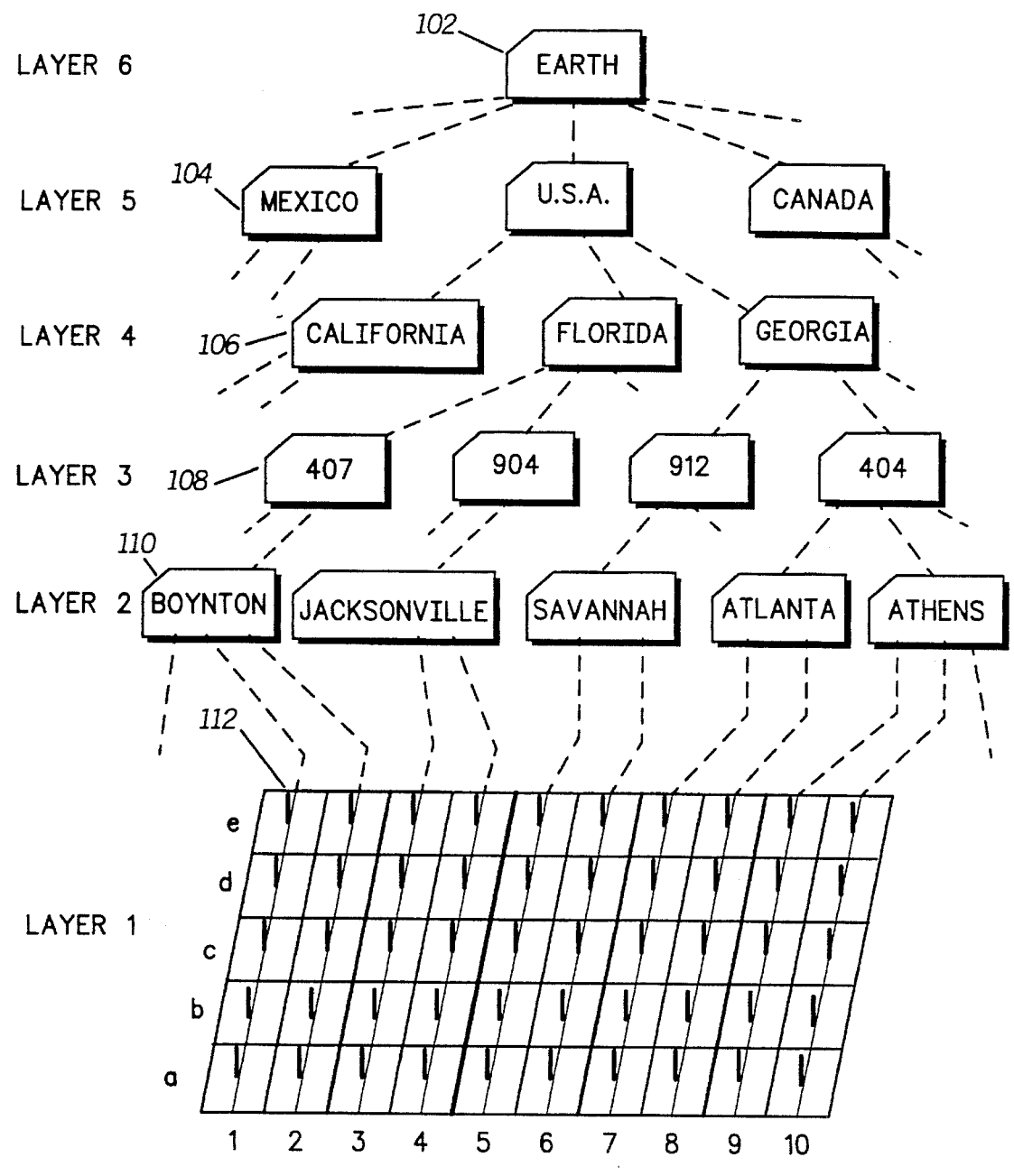

Referring to FIG. 1, there is shown a hierarchical structure for a communication system 100 in accordance with the invention. The covered area of the communication system 100 is organized into a hierarchical structure having several layers. The highest layer may be the earth 102 followed by country 104, state 106, area code 108, city 110, and the lowest layer (Layer 1) is a primary layer that comprises a plurality of independent paging regions (cells) 112, each region defines an area or location in which one may be paged. Each layer 1 cell comprises one or more base stations. Layer 1 may comprise a radio telephone communication system (e.g., Digital European Cordless Telephone). Not losing generality, from now on layer 1 cells shall be referred to as base stations. Each region of layer "i" (except the lowest layer) consists of several regions of layer "i–1.".

Each block in layers 2 through 6 (the secondary layers) is a communication service node representing a switching station having computing and memory means (i.e., all layers >1 are intelligent layers). The memory means comprises a database for tracking the location of customers (i.e., users of portable communication units that are registered in the system).

Figure 2:
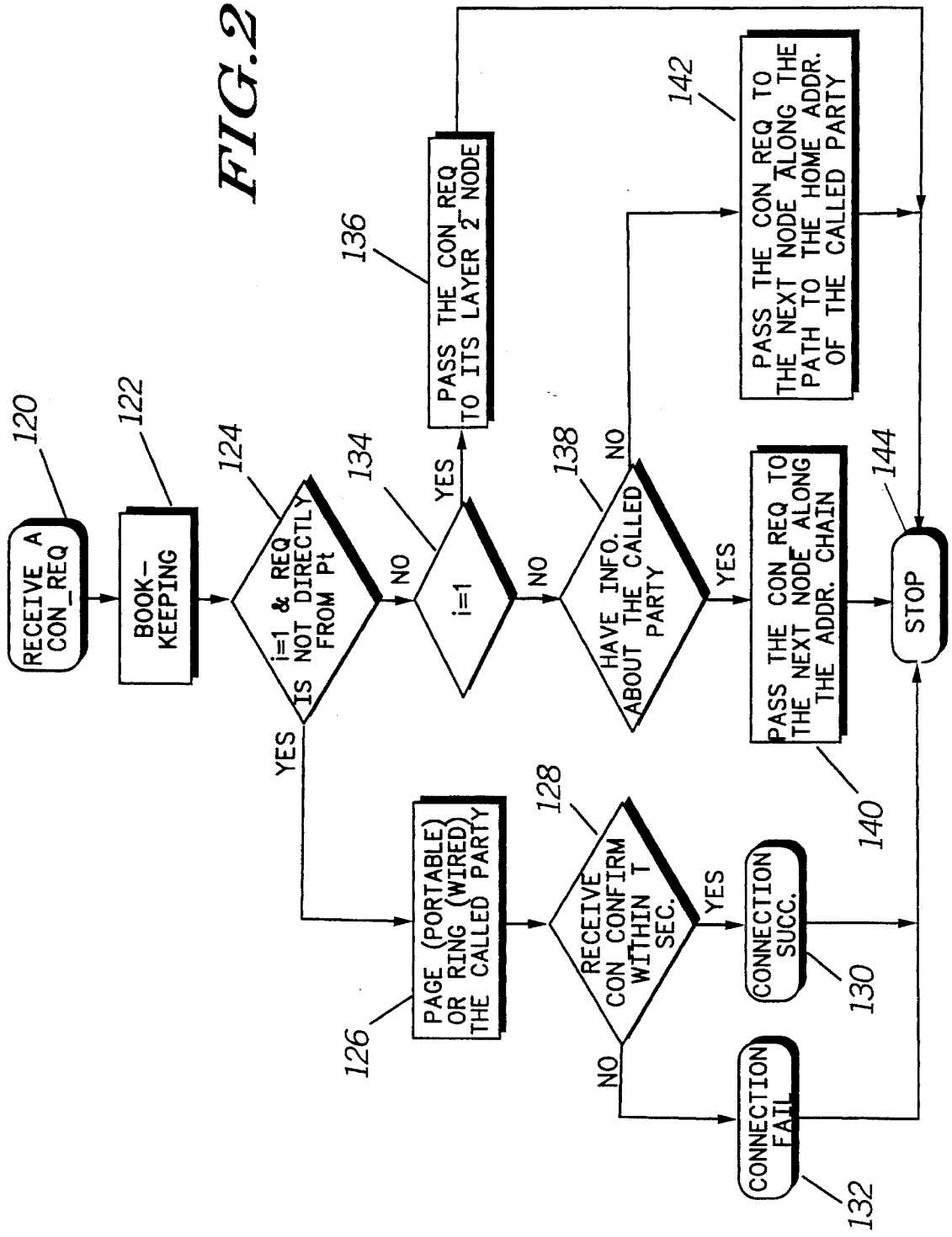

Referring to FIG. 2, there is shown a flow chart illustrating a process for receiving a connection request for a layer i node. In step 120, a connection request packet is received at a node in layer i. The connection request packet, sent by a calling communication unit, requests a connection between the calling communication unit and a called (portable) communication unit. The call request packet comprises code identifying the called portable unit by its home address. In step 122 the system keeps track of the possible connections (i.e., bookkeeping).

In decision 124, a determination is made as to whether (1) the connection request is received at the first layer and (2) the connection request was not received directly from a portable communication unit. If the determination of decision 124 is affirmative, the called party is paged (if it is a portable) or rung (if it is a fixed telephone) (step 126). In decision 128, it is determined whether a connection confirmation signal is received from the called communication unit within a predetermined period of time. If the determination made in decision 128 is affirmative, the connection is successful (step 130). If it is negative, the connection attempt fails (step 132).

If the determination in decision 124 is negative, then a further decision 134 is made to determine whether the connection request was received in the first layer. If decision 134 is affirmative, the connection request is passed to its parent node in layer two (step 136). The process then continues to the stop step (144) for that node.

If decision 134 is negative a further decision 138 is made to determine whether there is any information relating to the called party in the database corresponding to the current node. If decision 138 is affirmative, the connection request is passed to the next node along the address chain (step 140). If the determination in step 138 is negative, the connection request is passed to the next node along the path to the home address of the called party (step 142). Following either step 140 or 142, the process stops (step 144). The node passes on the connection request, and the process begins again (at step 120) for the next node receiving the connection request.

Referring to FIGS. 3a and 3b, there is shown a set of possible address structures for portable communication units. These address structures include a field for each of the layers.

There are two kinds of addresses used in the system: (1) home addresses; and (2) physical addresses. The home address is the registered address of the portable communication unit (i.e., the same as a telephone number). The incoming calls will find the portable communication unit in this address unless it has moved to another area or it has been turned off. The physical address is the address where the portable communication unit can be actually reached. When hand over (or handoff) happens, two physical addresses are needed: (1) the current address, which indicates the physical address of the base station to which the portable unit is locking; and (2) the new address, which indicates the physical address of the desired new base station. In the case of a fixed subscriber, the physical address is always identical to the home address. The physical address of a portable communication unit is obtained in the messages broadcasted from the port.

Referring to FIG. 4, there is shown a representation of a possible database of a node. "$HA_j$" is the home address of customer "j" and "$Add_j$" is the current address field for customer "j".

A customer is classified by the number of the lowest layer that covers all the service areas of the customer. A service area is any area that the customer selects to be reached at. The home address of a customer must be in one of the service areas. The symbol "pc" is used to denote the class of the customer.

Referring again to FIG. 1, for example pc=4, if customer 1 wants to be reached anywhere in area code "404" and Savannah because the lowest level common node (Georgia) is at layer 4. If customer 2 wants to be reached anywhere in area code 407, Atlanta and California, the pc will be 5 because the lowest level common node (U.S.A.) is at layer 5. Also, pc=2 if customer 3 wants to be reached only in Boynton. The service areas are chosen by customers and the associated information is stored in the portable communication units. The information may also be stored elsewhere (e.g., for credit purposes). The classification pc of a portable communication unit is derived easily from its service areas as follows: Define $SA_i$ be the address of the ith service area of the portable communication unit which contains all the layer addresses from the service area and up with all the lower addresses filled with "don't care" marks '?'. For example, if the second service area of a portable communication unit is Florida, the $SA_2$ of the customer will be {U.S.A., Florida,?,?,?}. Also, if the third service area of the customer is Atlanta, the $SA_3$ will be {U.S.A., Georgia, "404", Atlanta,?}. Define $Q_{ij}$ to be the highest layer where the address of the ith and the jth service area of a customer are different. For customer 1, for example, $Q_{12}$=3. Suppose no more than M service areas are chosen by each customer. Then the customer class is:

$$pc=1+max\ Qij\ i,j^*M$$

There are three kinds of entities in the database of layer i with each entry associated with an active customer of class i or higher:

(1) portable communication units which registered in the ith layer region and are now outside the region (i.e., native customers that are outside the covered area);

(2) the portable communication unit which registered outside the ith layer region and is now inside the region (i.e., a foreign customer having a home address outside and a current address inside the covered area); and (3) portable communication units which registered in the ith layer region and are now inside the region, but in a different i–1 layer region from where they registered (i.e., a native customer having a different current address from its home address at the next lower layer).

The address information field may contain one of the following three entries:

(1) an "OUT" mark which indicates that the native portable communication unit is outside the covered region;

(2) the physical address of the i–1 layer for the foreign portable communication unit; and (3) physical address of i–1 layer for the native portable communication unit.

In this system an active customer does not necessarily communicate on the portable communication unit, but the movement of the portable communication unit is traced by the system. A customer is active when the power of the portable communication unit is on. To reduce the burden on the system, it is possible to charge customers in terms of the number of tracing messages for their portable communication units. A class 0 customer is defined to be reached only at a home address (i.e., a fixed telephone).

Figure 5:
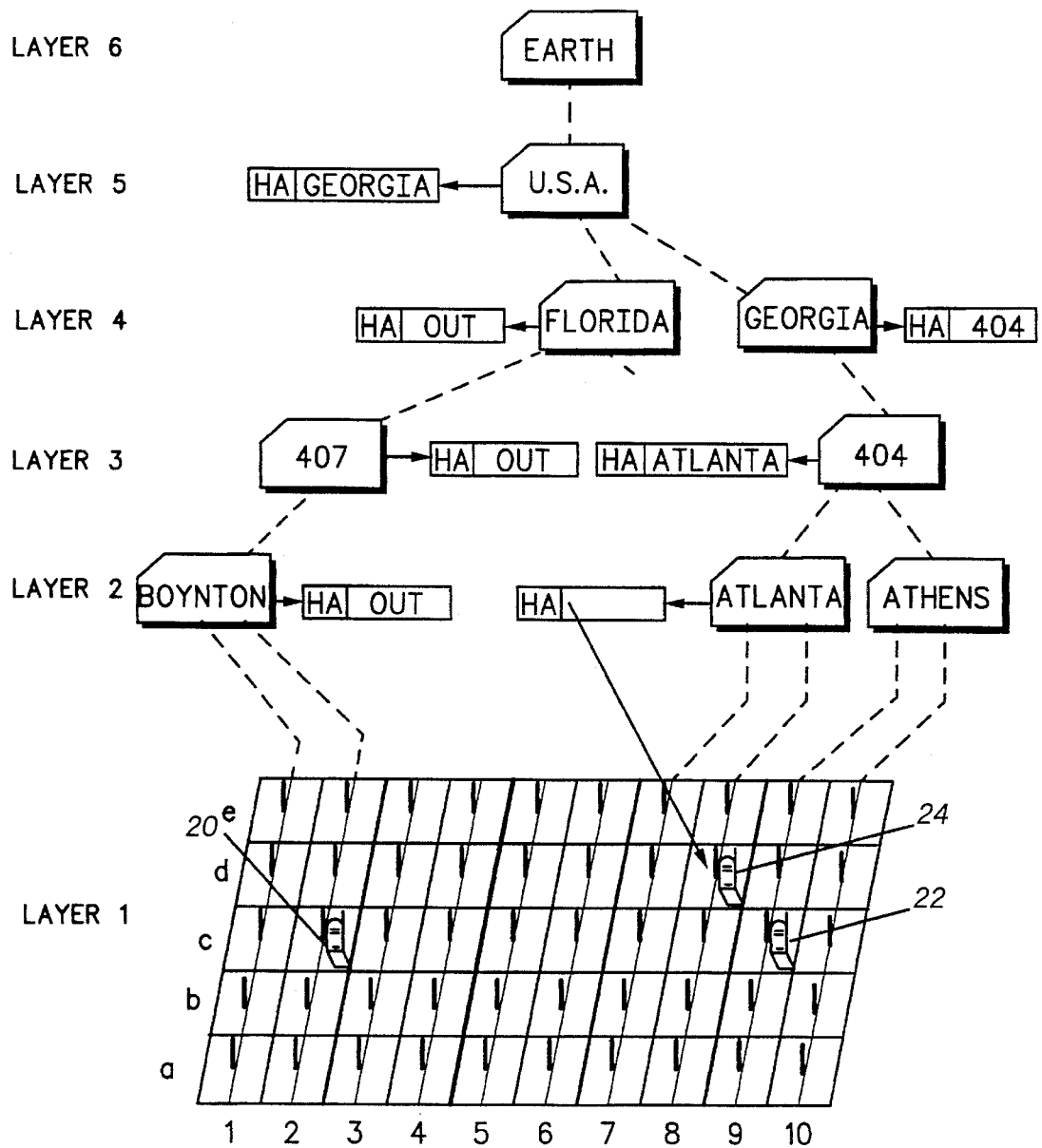

Referring to FIG. 5, there is shown a diagram illustrating an example of an address chain before moving for a portable communication unit 24 of class 5 or 6. In this example, the called party (unit 24) has a home address in cell 1,d, and a current address at cell 8,d. In a first case, the communication unit 20, located in cell 2,c, places a call to communication unit 24. The communication unit 20 merely dials the home address number of the called party. The calling party's connection request is received by a base station at cell 2,c, and it is passed on to the Boynton node in layer 2.

At the Boynton node, the corresponding database is searched for an entry relating to the called party. In this case an entry is found in the database. The entry contains the home address (HA) of the called party and an "OUT" indication. The call is then forwarded along the address chain to the "407" node of layer 3, where the database also contains the home address of the called party and an "OUT" indication. Thus, the connection request is further traced up through the Florida node of layer 4, also indicating that the called party is "OUT". Then, in the U.S.A. node of layer 5 the database indicates that the portable 24 is in Georgia. The tracing then continues to the Georgia node, where the area code "404" is indicated. Thereafter, the tracing process continues to the "404" node, where "Atlanta" is indicated. Searching in the Atlanta database reveals the precise location of the portable communication unit 24, and the requested connection is made.

Referring again to FIG. 5, in a second case the call for the called party is made from a calling communication unit 22 (also a portable in this example) located at cell 9,c. Accordingly, the call is received at the base station in cell 9,c, and is passed on to the Athens node in layer 2. There is no entry relating to the called party in the Athens database. Therefore, the connection request is passed on to the next node toward the home address of the called party (i.e., the "404" node). The database at the "404" node contains an entry (HA, Atlanta) indicating that the called party is in Atlanta. The connection request is accordingly passed on to the Atlanta node where the exact location of the portable 24 is determined to be in the 8,d cell, and the requested connection is made.

The problem remaining is how to maintain the databases. The database updating process is initiated by portable communication units. Each base station continuously transmits its subsystem identification information. By monitoring this information from the surrounding bases, an active portable communication unit is able to select a desired base station (e.g., the strongest base) and lock on to it. Whenever a new strongest base is found, up to two messages may be transmitted to the associated bases to update address chains. The address of the base to which the portable communication unit is locking is called the current address and the address of the base of the new strongest base is called the new address.

In order to update the tracing chains it is required to introduce the layer difference numbers $R_{ch}$, $R_{nc}$, and $R_{nh}$ and the layer difference indexes $C_{ch}(i)$, $C_{nc}(i)$, $C_{nh}(i)$ and $C_{hn}^*(i)$ where the subscript ch indicates that the difference is in terms of the current address and the home address and nh is in terms of the new address and the home address. The above-mentioned addresses are portable communication unit addresses. Similarly, nn* is in terms of the new address of the portable communication unit and the address of the ith layer node at which the M message was received and hn* is in terms of the home address of the portable communication unit and the address of the ith layer node at which the M message was received.

The layer difference number Rch is the number of the highest layer where the current address and the home address of the portable communication unit are different. For example in FIG. 1, $R_{ch}$=4 if a portable communication unit is located (current address) somewhere in Atlanta (col. 7) and is registered (home address) somewhere in Boynton Beach (col. 1 or 2). The other layer difference numbers are defined in the same manner.

The layer difference index $C_{nh}(i)$=True if the new address and the home address of the portable communication unit are the same at the ith layer, otherwise $C_{nh}(i)$=False. For example, (see FIG. 1) $C_{nh}(4)$=True, and $C_{nh}(3)$=False, if the portable communication unit finds a new strongest port (new address) in Jacksonville and is registered (home address) somewhere in Boynton Beach. The other layer difference indexes are defined in the same manner.

The value of all the layer difference numbers and layer difference indexes are derived easily from the addresses.

Definitions:

Active(t)=True, if the portable communication unit is active at time t, or False, otherwise.

Turn_on=True, if not Active (t) and Active(t+Δt), or False otherwise.

Turn_off=True, if Active(t) and not Active(t+Δt), or False, otherwise.

Define $SA=U_{i=1 \ldots M}$ area $(SA_i)$, where area $(SA_i)$ is the ith service area represented by the address $SA_i$.

Also define: $IN_c$=True, if current address $\epsilon$ SA, or False, otherwise, $IN_n$=True, if new address $\epsilon$ SA, or False, otherwise.

The basic ideas of the algorithm that portable communication units employ are as follows.

An active portable monitors the environment for base signals. The portable determines (1) whether the current and new addresses are both inside the service area (i.e., whether INc and INn are true), and (2) whether the new address and the current address are not the same at the first layer (i.e., whether a paging boundary is crossed, or Cnc(1) is false). If the current and new addresses are both inside the service area, and the new address and the current address are not the same at the first layer, the portable communication unit transmits a message (M1) to the new port, and a second message (M2) to the current port. The portable communication unit then continues monitoring the environment.

The portable also determines whether it is outside its home address, and whether the following additional conditions are met: (1) it is in its service area and turned off, (2) it is inside its service area but moving outside of its service area, or (3) there exists unsuitable usage conditions. If the above determination is affirmative, the portable transmits a third message (M3) to the current port. The portable communication unit then continues monitoring the environment.

The portable also determines whether (1) the portable is not at its home address, and (2) it is activated (i.e., turned on) inside its service area or it is moving into a service area. If those conditions are met, a fourth message (M4) is sent to the new port and the portable communication unit continues to monitor the environment. The foregoing discussion may be represented by the following case statement:

```
Case
Begin
    INc & INn & not Cnc(1):         Send M1 to new port
                                    Send M2 to current port
    not Cch(1) & [INc & Turn_off) or (INc & not INn) or
unsuitable usage]:
                                    Send M3 to current port
    not Cnh(1) & [(INc & Turn_on) or (INn & not INc)]:
                                    Send M4 to new port
End
```

There are five fields in each of the M messages: (1) message type, (2) current address, (3) new address, (4) home address, and (5) pc. After receiving these M messages, the base station transmits them immediately to its layer i+1 parent node.

The logic of the process employed at each of the nodes of layer i after receiving M messages is as follows.

Figure 6:
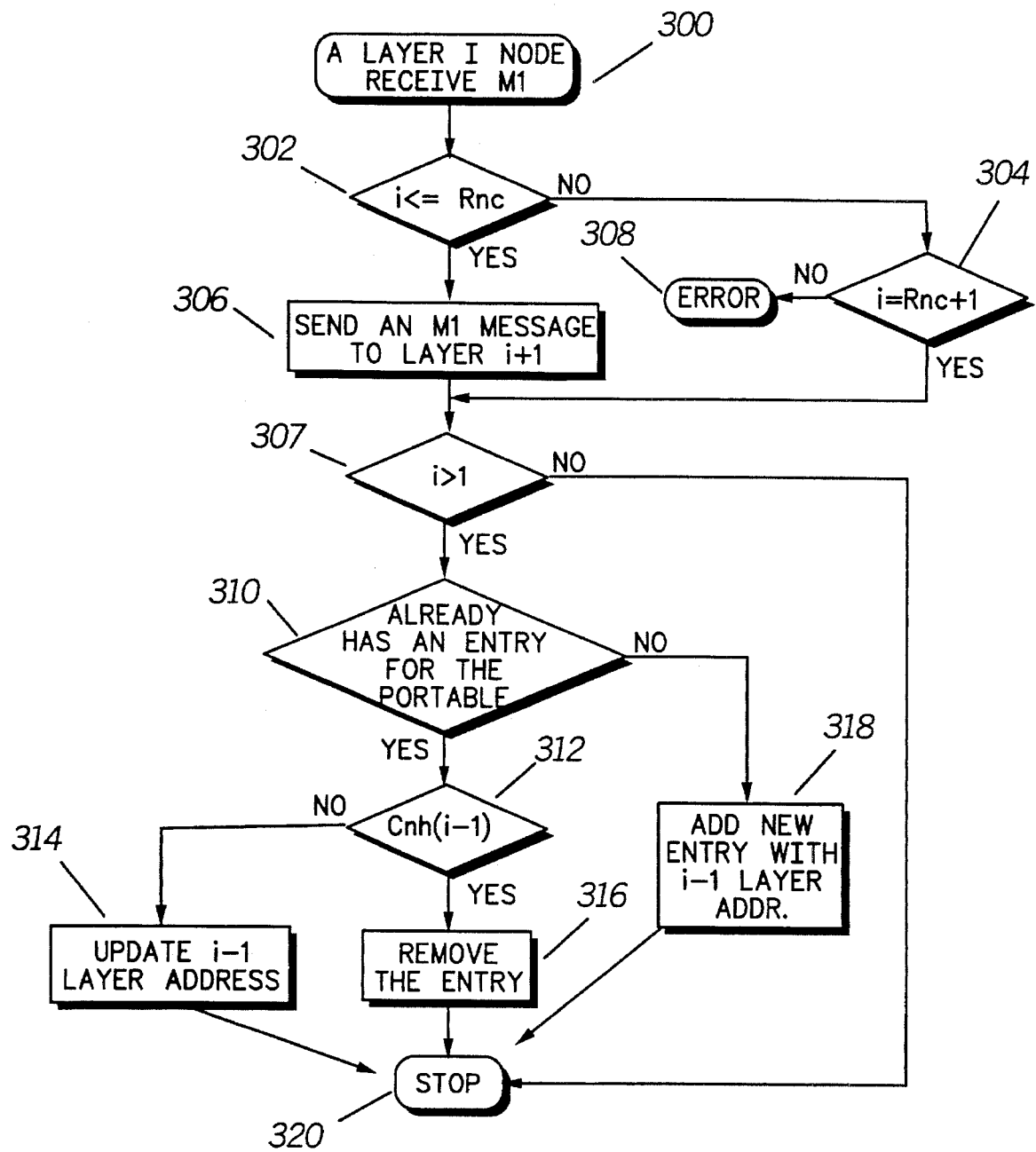

Referring to FIG. 6, there is shown a flow chart for nodes receiving M1 messages. In step 300 a first message M1 is received in a node in layer i. A decision 302 is then made determining whether i is less than or equal to the number of the highest layer where the new and current addresses of the portable communication unit are different (i.e., whether i<Rnc). In step 306, the message M1 is sent to its layer i+1 parent communication service node when the determination of step 302 is affirmative.

Then in decision 307 it is determined whether i is greater than one. When the determination of step 307 is negative, the process is stopped (320) for the node in layer one. When decision 307 is affirmative, a further decision 310 is made determining whether there is an entry for the portable communication unit in the database of the layer i node.

When the determination of step 310 is affirmative, a decision 312 is made determining whether the new address and the home address of the portable communication unit are the same at the i−1 layer. When the determination of step 312 is affirmative, the entry relating to the portable communication unit at the database of the layer i node is removed in step 316, and the process stops (320) for the communication service node in layer i.

When the determination of step 312 is negative, the i−1 layer address relating to the portable communication unit is updated and the process stops (320) for the layer i node.

When the determination of step 302 is negative, a further decision 4 is made to determine whether i is equal to the sum of one and the number of the highest layer where the new address and the current address of the portable communication unit are different.

When the determination of step 304 is affirmative, the process continues at decision 307. When the determination of step 304 is negative, it is determined (in step 308) that an error exists.

When the determination of step 310 is negative, a new entry will be added in the database at the layer i node with the layer i−1 new address of the portable communication unit stored in the address field in step 318, and the process is stopped (320) for the layer i communication services node.

Figure 7:
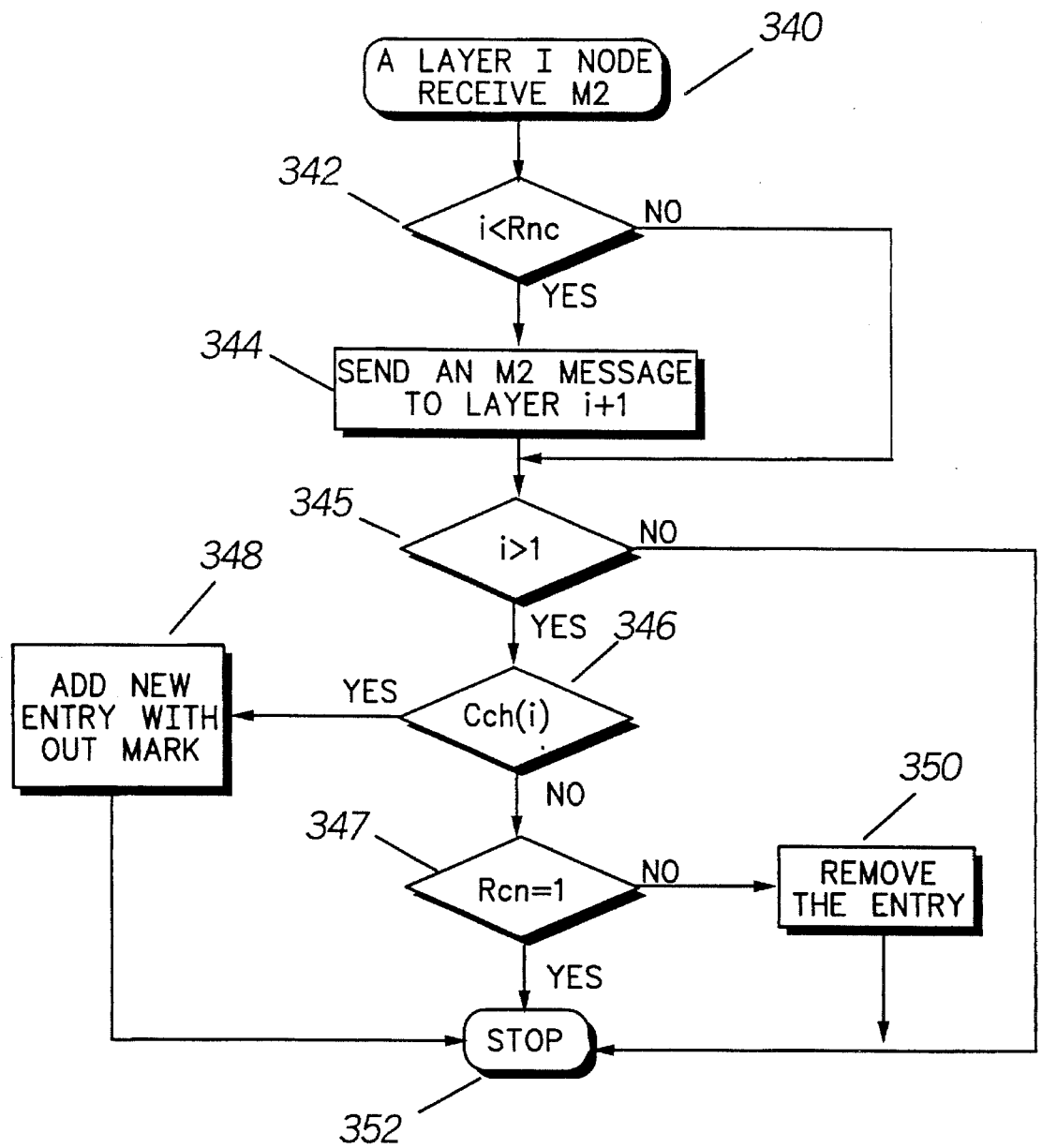

Referring to FIG. 7, there is shown a flow-chart for nodes receiving M2 messages. In step 340, the second message M2 is received in a base station or a communication service node in layer i.

In decision 342 it is determined whether i is less than the number of the highest layer where the new address and the current address of the portable communication unit are different. When the determination of step 342 is negative, the process proceeds to step 345. When the determination of step 342 is affirmative, the M2 message is sent to its layer i+1 parent node in step 344.

Then in decision 345 it is determined whether i is greater than 1. When the determination of step 345 is affirmative, a further decision 346 is made to determine whether the current address and the home address of the portable communication unit are the same at layer i. When the determination of step 345 is negative, the process stops (352) for the layer i node.

When the determination of step 346 is affirmative, a new entry relating to the portable communication unit with an "OUT" mark is added (in step 348) in the database at the layer i node if no entry exists, otherwise the entry is modified by the addition of the "OUT" mark. The OUT mark indicates that the portable communication unit is not at its home address. The process then stops (352) for the layer i communication services node. When the determination of step 346 is negative, a further decision 347 is made to determine whether the first layer is the highest layer where the current address and the new address of the portable communication unit are different.

When the determination of step 347 is negative, the entry relating to the portable communication unit in the database of the layer i node is removed in step 350, and the process for the layer i communication services node is stopped (352). When the determination of step 347 is affirmative, the process for the layer i communication services node stops (352).

Figure 8:
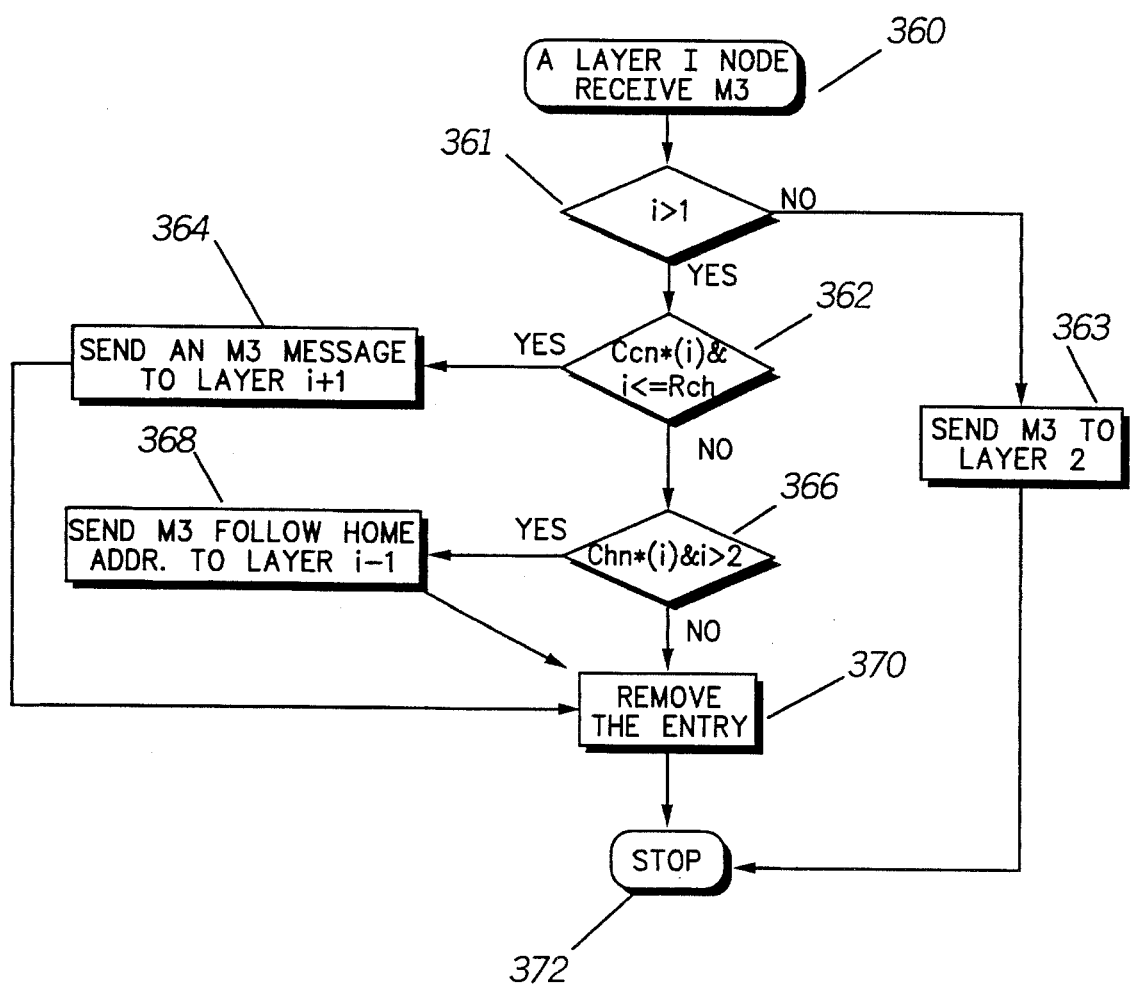

Referring to FIG. 8, there is shown a flow-chart for nodes receiving M3 messages. In step 360, the third message M3 is received in a node in layer i.

In decision 361, it is determined whether i is greater than one. When decision 361 is negative, the third message is sent to its second layer parent node, and the process stops (372) for the node in layer one. When the determination of decision 361 is affirmative, a further decision 362 is made determining whether the current address of the portable communication unit and the address of the node, at which the third message was received, are the same at layer i, and whether i is less than or equal to the number of the highest layer where the current address and the home address of the portable communication unit are different.

When decision 362 is affirmative, the M3 message is sent to its layer i+1 parent node in step 364. Then in step 370 the entry relating to the portable communication unit is removed from the database of the node in which the third message was received, and the process stops (372) for the layer i communication services node.

When decision 362 is negative, a further decision 366 is made to determine whether the home address of the portable communication unit and the address of the node in which the third message was received are the same at layer i, and whether i is greater than two. When decision 366 is affirmative, the third message is sent to its layer i−1 child node along the path leading to the home address of the portable communication unit, and the process continues at step 370. When decision 366 is negative, the process continues at step 370.

Figure 9:
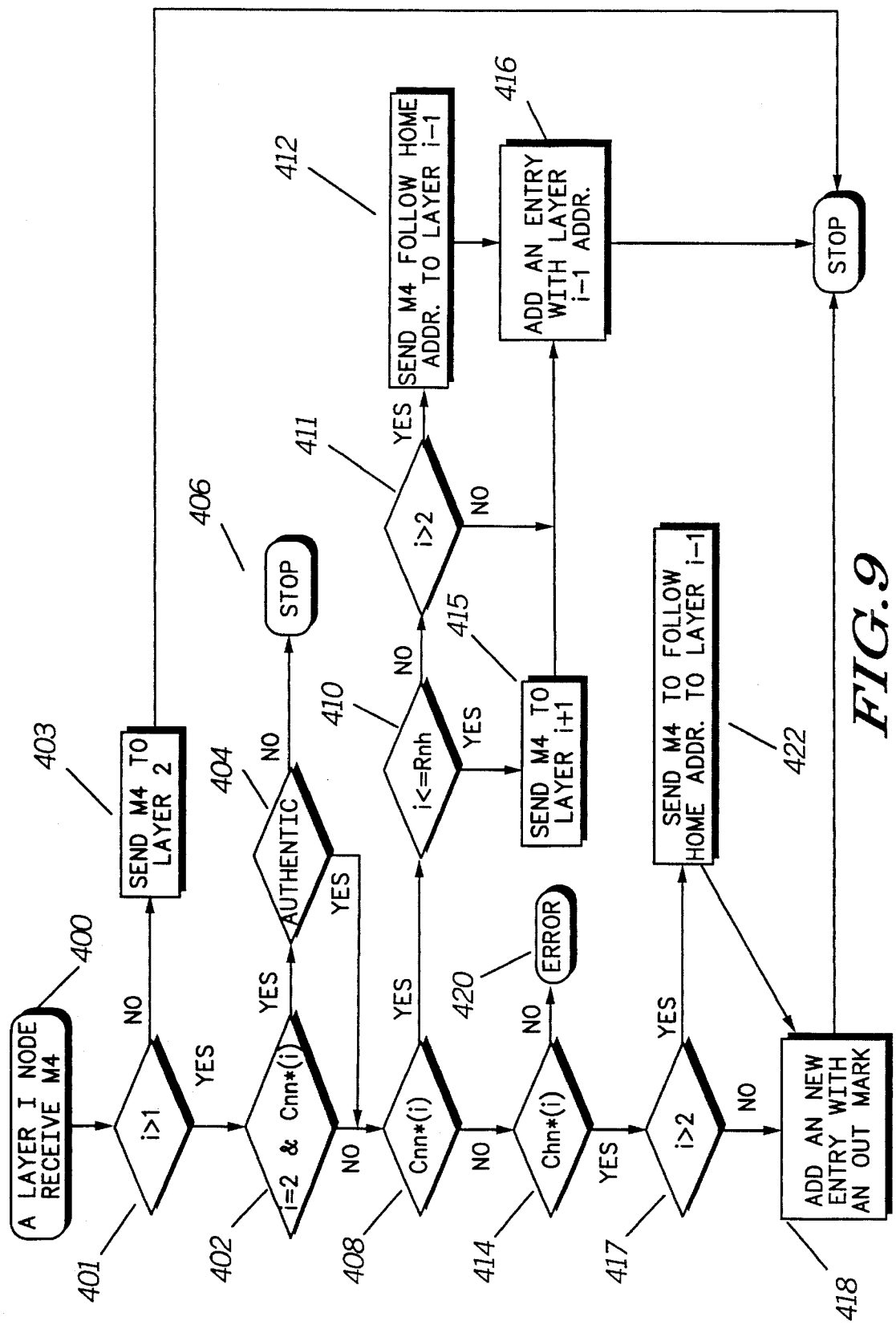

Referring to FIG. 9, there is shown a flowchart for nodes receiving M4 messages. In step 400 a layer i node receives a M4 message. In decision 401 it is determined whether i is greater than one. If decision 401 is negative, a M4 message is sent to layer 2, step 403, and the process stops. If decision 401 is affirmative, a further decision 402 is made to determine if i equals two, and if the new address of the portable communication unit and the address of the node at which the fourth message was received, are the same at layer i. If decision 402 is negative, a decision 408 is made. If decision 402 is affirmative, a decision 404 is made.

In decision 404, the layer i node will make an authentication test to determine whether the customer (portable communication unit) is authentic. If decision 404 is negative, the process stops (406) for the layer i node. If decision 404 is affirmative, the process continues at decision 408.

In decision 408 it is determined whether the new address of the portable communication unit and the address of the node at which the fourth message was received, are the same at layer i. When decision 408 is negative, the process continues at decision 414. When decision 408 is affirmative, a further decision 410 is made determining whether i is less than or equal to the number of the highest layer where the new address and the home address of the portable communication unit are different.

When the determination of step 410 is affirmative, the fourth message is sent to its layer i+1 parent node in step 415, and the process continues at step 416. When the determination of step 410 is negative, a further decision 411 is made determining whether i is greater than two.

If decision 411 is affirmative the fourth message is sent to the layer i−1 child communication services node along a path leading to the home address of the portable communication unit. Then the process continues at step 416. If decision 411 is negative, the process continues at step 416. In step 416, an entry with the layer i−1 address of the portable communication unit is added in the database of the node, and the process stops for the layer i communication services node.

In decision 414 it is determined whether the home address of the portable communication unit and the address of the node at which the fourth message was received, are the same at layer i. If decision 414 is negative then it is determined in step 420 that there is an error, and the process stops.

When the determination of step 414 is affirmative, a further determination is made as to whether i is greater than two in decision 417. If decision 417 is affirmative, the fourth message is sent (422) to the layer i−1 child communication services node along a path leading to home address of the portable communication unit, and the process continues at step 418. If decision 417 is negative, the process continues at step 418.

In step 418, a new entry relating to the portable communication unit with an "OUT" mark is entered in the database at the layer i node, and the process stops for the layer i communication services node. The OUT mark indicates that the portable communication unit is not at its home address.

Figure 10:
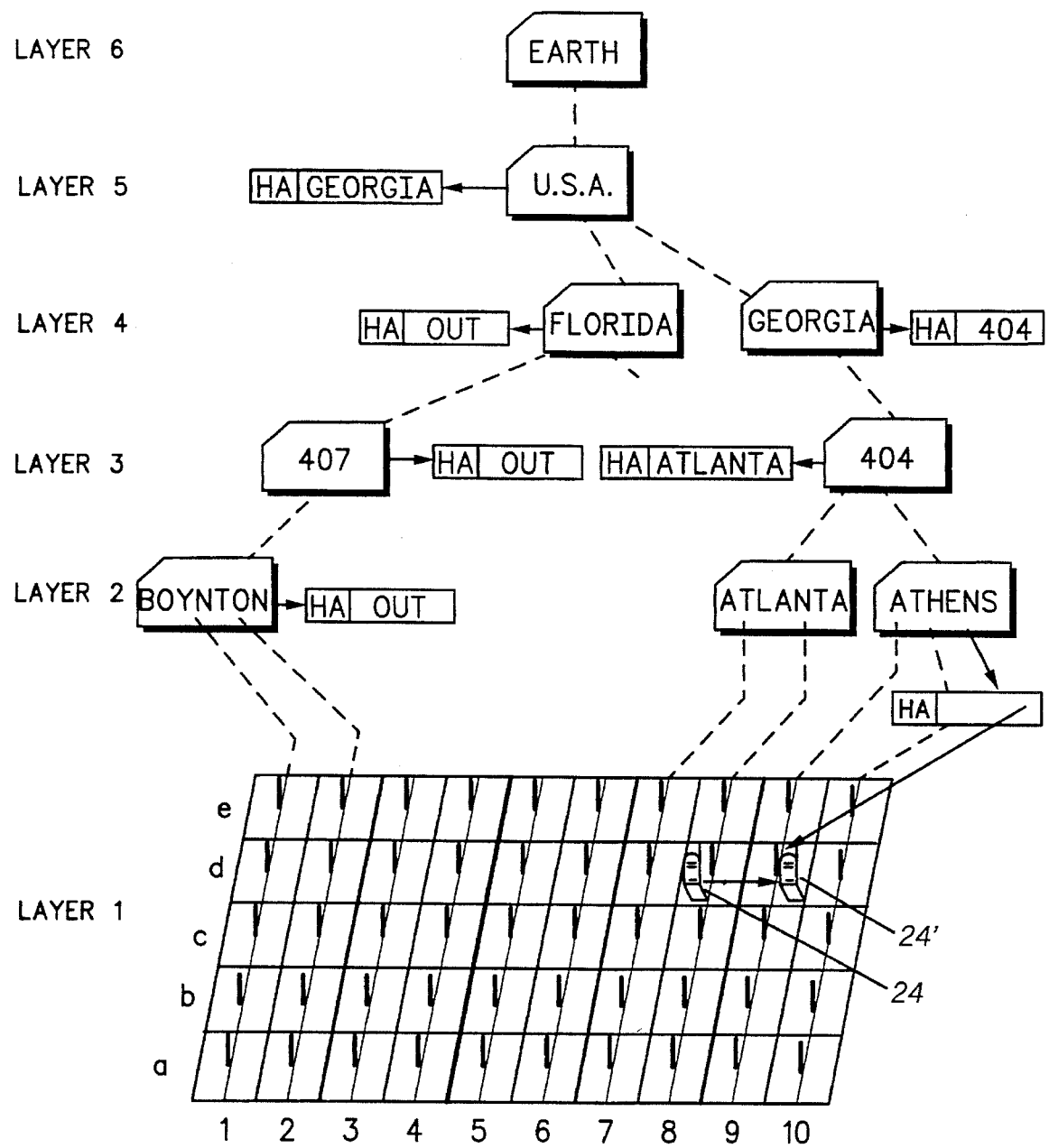

Referring to FIG. 10, there is shown an example of an address chain for a customer of class 5 or 6 (after moving). In this example, the user of portable communication unit 24 has a home address as follows: (U.S.A., Florida, 407, Boynton, 1,$d$). The portable 24 is moving from 8,$d$ to 9,$d$ (indicated by the portable's phantom image 24'). Thus, the portable 24 has a current address as follows: (U.S.A., Georgia, "404", Atlanta, 8,$d$), and a new address as follows: (U.S.A., Georgia, "404", Athens, 9,$d$). As the portable 24 moves out of cell 8,$d$, it transmits a message M1 to the base station in cell 9,$d$, and a M2 message to the base station at cell 8,$d$.

According to the invention, when the base station at 9,$d$ receives the M1 message, it is transmitted to the Athens node. When the Athens node receives the M1 message it will send the message to node "404", and add an entry indicating that the portable unit 24 is currently in cell 9,$d$. Then the "404" node updates the entry to indicate that the current address for unit 24 is now in Athens (the entry shown is prior to the updating because Atlanta is shown).

Thus a communication system in accordance with the invention provides a distributed database including location information relating to portable communication units within the system, and processes for tracing the portable communication units and for updating their locations, thus avoiding the necessity of maintaining a single database for the whole system.

II. DESCRIPTION OF A SECOND EMBODIMENT OF THE INVENTION

The discussion of the second embodiment should be considered with reference to the description of the first embodiment. The second embodiment integrates different systems to form a universal portable communication system (UPCS). The moving customers are located globally in a cost efficient manner as long as the calling and the called parties are active in one of the subsystems. The UPCS may have any number of subsystems, in the following description the number of subsystems in a UPCS confined to three: personal PCS, vehicular cellular, and aircraft (passenger telephones systems within aircraft) systems. Furthermore, UPCS operates even when the two parties are active in different subsystems. In other words this invention makes it possible for any customer to communicate instantly with anyone else anywhere in a cost efficient way as long as they are in the UPCS which is an integration of several different portable communication subsystems.

Figure 11:
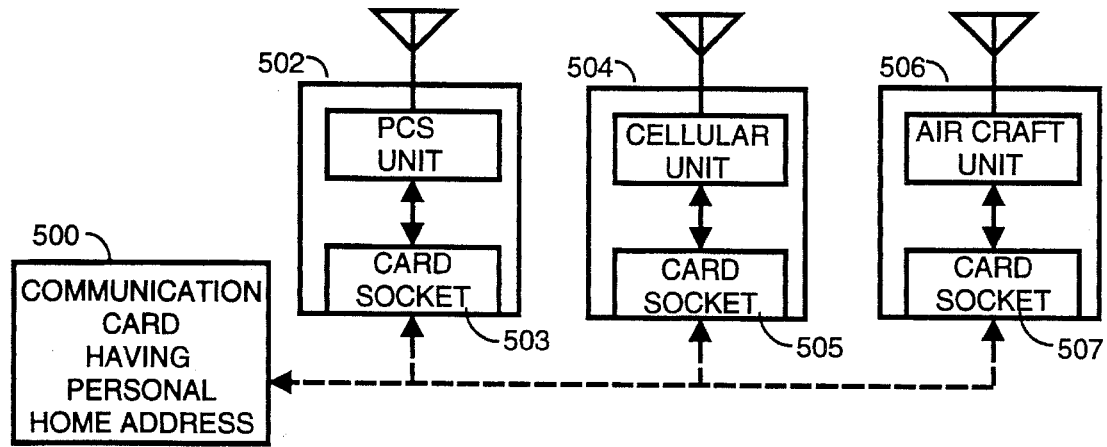
FIGS. 11 through 19 show a second preferred embodiment of the invention.

FIG. 11 shows each type of transceiver usable in accord with the second embodiment of the present invention, along with a communication card for use with each transceiver. Each customer is equipped with a communication card 500. The communication card 500 may resemble an ordinary a credit card. However, the communication card has stored therein customer information for authentication purpose, and the unique predetermined home port address of a customer. Additionally, the customer information may include the subsystems the customer wants to use. By this arrangement, the choice for a customer ranges from a fixed transceiver to a portable transceiver located anywhere in the world no matter how fast he is moving.

FIG. 11 shows a personal communication system (PCS) unit 502 with a socket 503, a cellular unit 504 with a socket 505, and an aircraft unit 506 with a socket 507. Sockets 503, 505 and 507 accept communication card 500 to form a transceiver for use by the customer. The communication card 500 plugged into a telephone unit enables the function of the unit to operate as a transceiver in the UPCS. If the card 500 is plugged into the PCS unit 502, the cellular unit 504 or the aircraft unit 506 it actives the PCS, cellular or the air phone respectively to establish a radio frequency link between the transceiver and a base station associated with a port of the communication system. The transceiver will be paged or traced as the card ID number. In operation, the transceiver will ring if the number on the communication card is called. Furthermore, the transceiver will be traced when it is moving, and any billings will go to the holder of the communication card.

Figure 12:
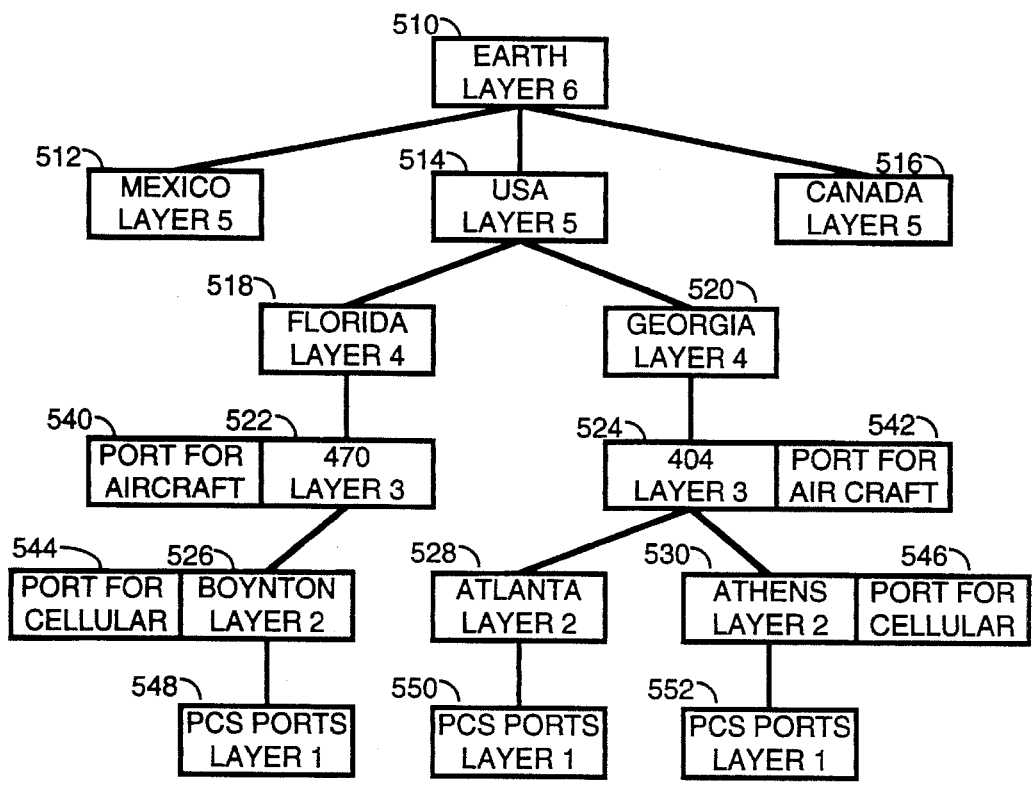

FIG. 12 shows an example of a communication system operating in accordance with the second embodiment of the present invention. The communication system is structured into layers of nodes and ports 510–552. Each port 540–552 for interfacing from the communication system to a transceiver with a radio frequency base station, and each node 510–530 having memory for a data base for establishing a hierarchical link between the ports. Each of the individual subsystems is structured in the way described in the first embodiment of the present invention. Several different hierarchical structures of these subsystems are integrated together to form the universal hierarchical structure with one restriction that they should have the same higher layer nodes as far as possible. For example, the global layer 510 should be located at the same position for all the subsystems.

The universal hierarchical structure is as follows: layer 1 is associated with the PCS coverage areas by ports 548–552, layer I (I>=2) is associated with the cellular coverage area by ports 544 and 546 (I=2 in FIG. 12), and layer J (J>=I+1) is associated with the aircraft coverage area by ports 540 and 542 (J=3 in FIG. 12). All the higher layers L (L>=J) are common for all the subsystems which has base stations in the coverage area of the layer L node. The PCS ports are called layer 1 ports and the cellular and aircraft ports are called layer I and layer J ports respectively. The associated customers are called layer 1 I or J customers respectively.

A layer m node is in the universal hierarchical structure if at least one of subsystems is present in its coverage area.

The classification of a transceiver is defined, in the first embodiment as the number of the lowest layer that covers all the service areas of the customer. The service areas are chosen by customers. The classification of a customer must be at least 1, I, or J if he is registered as a personal, cellular or air phone customer. The customer has the ability to chose any combination of the above mentioned subsystems in which to be reached. The classification information and the service areas of the customer are part of the user information on the communication card 500. The transceiver will reject a customer's connection request if the communication card is not qualified for the proposed connection. The transceiver will also reject a customer's connection request the reasons stated in the first embodiment. For example if the customer moves outside of the preselected coverage area, the transceiver rejects a connection request by transmitting a M3 message.

FIGS. 11 and 12 show a communication system having a plurality ports for transferring communication information through the communication system between a plurality users of transceivers, each transceiver being coupled to a port of the plurality of ports, and a plurality of nodes structured as a hierarchical system of nodes for transferring information between the plurality of ports. Furthermore, the coverage area of a base station operating on each of the above systems is substantially different. For example, a PCS area in which a transceiver may be paged by the system may be less than one kilometer, where a cellular area may be less than twenty kilometers and an aircraft area may be substantially greater than the cellular area. Thus the systems provides the ability wherein a first type of transceiver interface system (PCS) provides a radio interface within a first area size, a second type of transceiver interface system (cellular) provides a radio interface within a second area size, the second area size being substantially larger than the first area size, and a third type of transceiver interface system (aircraft) provides a radio interface within a third area size, the third area size being substantially larger than the second area size. By adjusting the area size to the speed of the customer movement, the amount of data base and node memory updating may be optimized for with the frequency spectrum reuse in the areas as described below.

Figure 13:
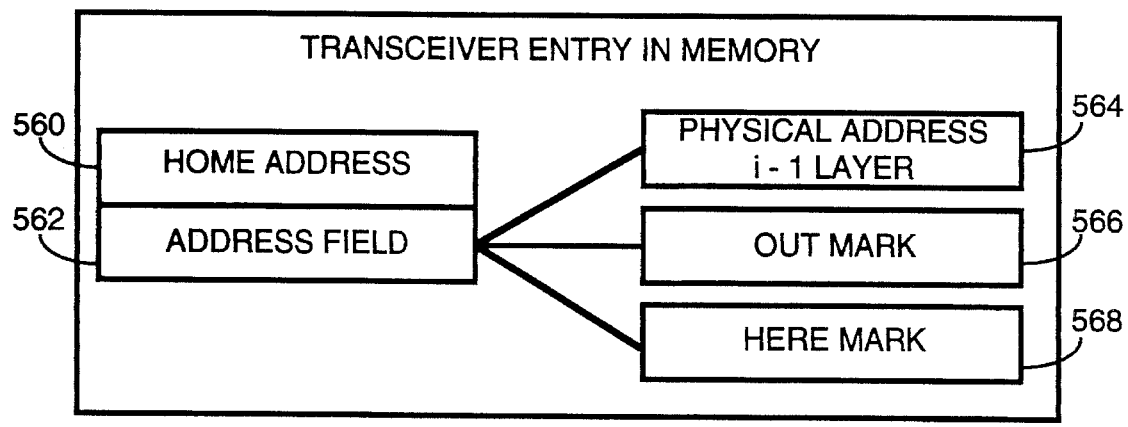

FIG. 13 shows a data base entry for a transceiver entry stored in the memory of a node in accordance with the second embodiment of the invention. There are two fields in each transceiver entry of the database. The first field 560 is the home address of the transceiver and the second field, the address field 562 is one of the following three choices: a physical address of i−1 layer for the transceiver 564, an OUT mark which indicates that a transceiver having a home address is outside the home address of the coverage region 566, or a HERE mark for a transceiver that is now in the coverage area of the node which is in the lowest layer of the associated subsystem 568. In operation, there will be no entry for a customer at a node unless the node is in one of the chosen service areas of the customer. As a result, there are four kinds of entries in the database with each entry associated with an active customer of class i or higher: transceivers which registered in the i'th layer region and are now outside the region as indicated by the OUT mark 566; the transceiver which registered outside the i'th layer region and is now inside the region or transceivers which registered in the i'th layer region and are now inside the region but in a different i−1'th layer region from where they registered as indicated by the physical address i−1 layer 563, and non-PCS transceivers which are now inside the coverage area of the node which is in the lowest layer of the associated subsystem as indicated by the HERE mark 568.

Figure 14:
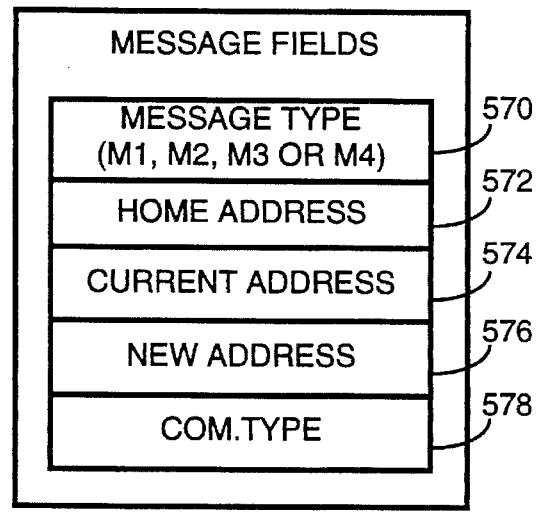

FIG. 14 shows the structure of "M" messages communicated within the communication system operating in accordance with the second embodiment of the present invent. There are at least five fields in each of the M messages. They are message type (M1, M2, M3 or M4), home address (from card 500), current address (from exiting port coverage area), new address (from entering port coverage area), and COM.TYPE (communication type of PCS, cellular or aircraft). COM.TYPE is derived from the current system information.

Messages M1 and M2 are used to setup a new hierarchical node chains and remove an old hierarchical node chains in an handover process respectively. Similar to the first embodiment, message M3 is used to remove an existing node chain when a transceiver becomes idle unlocked. Message M4 is used to set up a new hierarchical node chain when a transceiver becomes active. All the M messages are initiated by layer 1, I and J customers and initially received by layer 1, I and J ports respectively according to the current type of communication is personal, cellular or aircraft. COM.TYPE is defined to be 2 (by definition), I and J if the customer is currently in a personal, cellular or air phone subsystem respectively.

The flowchart of FIG. 15 shows the response of the nodes and ports in the communication system operating in accordance with the second embodiment of the present invention to a M1 message, step 580. When a port of layer 1 receives a M1 message, it sends a M1 message to its layer 2 node and the process stops, steps 582, 584 and 586. Otherwise, if the node is in layer 2 or above, it checks if it is on its upward updating path in a hierarchical chain, steps 588 and 590. If it is an upward path, the node will send a M1 message to its i+1 parent node, step 592. Otherwise the node is on top of the upward updating path of the hierarchical chain, and if the layer number i is bigger than 2 it will initiate downward updating by sending a M2 message along the transceiver's physical address 564 to an i−1 layer node, step 594. It will also check if there is an entry for the transceiver, step 596. In case there is not, it will add a new transceiver entry with a home address and physical address 564 equal to the new address 576 in step 598, and the process stops, step 586. In case there is an entry for the transceiver and the new address 576 and home address 572 of the transceiver are different in the i−1 layer of the address field of the entry associated with the transceiver, step 600, the physical address 562 of the transceiver entry will be changed for the i−1 layer to correspond to new address 576, step 602. The process then stops, step 586. Otherwise, there is an entry, but the new and home addresses of the transceiver are the same on the i−1 layer, and if the node is on the lowest layer of the associated subsystem, step 604, the address field 562 of the transceiver entry associated with the transceiver is marked HERE 568, step 606, and the process stops, step 586. Under the same conditions except that the node is not the lowest layer of the associated subsystem, the transceiver entry will be deleted step 608, thereby conserving memory in the node, and the process stop, step 586.

Thus, when the transceiver transmits an M1 message to the communication system because the customer has moved from an area covered by a current port to an area covered by a new port, the M1 message causes the addition of data indicative of the transceiver coupling to the new port to a node in a hierarchical chain of nodes which is both indicative of the new port and different from any node in a hierarchical chain of nodes indicative of the current port.

The flowchart of FIG. 16 shows the response of the nodes and ports in the communication system operating in accordance with the second embodiment of the present invention to a M2 message. When a node of layer i receives a M2 message from its i+1 parent node, step 620, if the node is not on the lowest layer of the associated subsystem, step 622, it will send a M2 message along the current address of the transceiver to its layer i−1 child node, step 624. In case the current and home addresses of the transceiver are the same on current layer, step 626, a new entry with an OUT mark 566 in its address field 562 is set to the transceiver entry and the process stops, step 630. Otherwise, in case the two addresses are different, the transceiver entry will be deleted from the memory of the node, step 632, thereby conserving memory in the node.

Thus, when the transceiver transmits a M1 message to the communication system because the customer has moved from an area covered by a current port to an area covered by a new port, the resulting M2 message causes the deletion of data indicative of the transceiver coupling to the current port from a node in a hierarchical chain of nodes which is both indicative of the current port and different from any node in a hierarchical chain of nodes indicative of the new port. Furthermore, if the new port is the same as the home port, the M2 message causes the deletion of data from all nodes in the communication system indicative of the transceiver in response to the transceiver coupling to the home port. Note also that the database of the highest node in the hierarchy is updated to point to a different child node, and some nodes in the hierarchy of home address chain are modified with an OUT mark.

Furthermore, each time a customer moves from an area covered by one port to an area covered by another associated with another node, a modification to the data bases of the nodes occurs. For fast moving customers, the amount of data base modification within the communication system may become extensive. The amount of modification is reduced in the present system by providing communication systems having various coverage areas. Preferably, for a personal customer, the PCS transceiver is used, and for a customer using ground transportation such as an automobile, the cellular transceiver is used, and for a customer moving very fast, the aircraft transceiver is used. Pricing of the use of various transceivers could be arranged to encourage the customer's use of the each respective transceiver in each respective mode. This provides a method of both providing frequency spectrum efficient communication for a personal customer and for reducing modification of a data base of a communication system for tracking a location of a customer in an automobile moving from a first location to a second location, because if customer travels through a first number of PCS cells of a PCS radio interface system a substantial amount of data base updating would be performed. However, if the customer travels through a second number of cellular cells of a cellular radio interface system while moving from the first location to the second location the amount of data base updating is reduced because the second number of cells is less than the first number of cells. Thus, frequency spectrum efficiency realized when the user is stationary at the first or second location by the user selecting to couple to the PCS radio interface system when substantially stationary at either the first of second location, and reduction of modification to the data base is realized by the user selecting to couple to the cellular radio interface system when moving between the first and second location.

The flowchart of FIG. 17 shows the response of the nodes and ports in the communication system operating in accordance with the second embodiment of the present invention to a M3 message. When a node receives a M3 message, step 640, a layer I node, step 641 will send a M3 message to a layer 2 node, step 642 and the process stops, step 644. When a node of layer i>1 receives a M3 message, it will delete the transceiver entry from the memory of the node, step 645, thereby conserving memory in the node. If the node is found on the upward updating path, step 646 it will send a M3 message to its layer i+1 node, step 648. Otherwise, it is on the top of the updating path or on a downward updating path and, if the current layer number i>2, step 650, it will send a M3 message along the home address of the transceiver to the layer i−1 node step 652.

The flowchart of FIG. 18 shows the response of the nodes and ports in the communication system operating in accordance with the second embodiment of the present invention to a M4 message. When a node receives a M4 message, step 660, if the message is received at a node coupled to a port coupled to the transceiver step 662, an authentic test is performed, step 664. If the transceiver is not qualified to use the current subsystem the request is rejected and the process stops, step 666. Otherwise the following functions are performed. If received at level 1, step 668, it sends a M4 message to its layer 2 node, step 670, and the process stops step 666. When a node of layer i>1 receives a M4 message, and if it is on its upward updating path, step 672, a M4 message is sent to its layer i+1 node, step 674, and a transceiver entry with a with the new address 576 is entered in the address field 562 is added in the memory of the layer i node, step 676 and the process stops, step 666. If the node is on the downward updating path or on the top of the updating path and the current layer is higher than two, step 678, a M4 message is sent along the home address of the transceiver to the layer i−1 node of the current node, step 680. In case the node is on the top of the updating path, step 682, a transceiver entry with proper layer i−1 address is added in the associated memory of the node, step 684, and the process stops, step 686. If the node which is not a PCS node receives the M4 message directly from a transceiver which becomes active in its home address, step 686, a new entry with a HERE mark is added in the node memory, step 688. Otherwise, a transceiver entry with an OUT mark is added in the memory of the node, step 692, unless the node receives the M4 message directly from a transceiver which becomes active in its home address, step 690, in which case the process stops.

The flowchart of FIG. 19 shows the response of the nodes and ports in the communication system operating in accordance with the second embodiment of the present invention to a connection request caused by the initiation of a call to or from a customer. After receiving a connection request (CON_REQ), step 700, a layer i node will do some bookkeeping, step 702. In case there is information about the called party in the associated database, step 704, and the HERE mark is set, step 706, the node will initiate a paging process at the port associated with the node, step 708. Otherwise, (not a HERE mark) the connection request will be passed to the next node along the address chain, step 710, and the process stops, step 712. In case there is no information about the called party in the associated database of the node's memory, and if the connection request is not received directly from a transceiver for a PCS subsystem node, step 714, a paging process will be initiated, step 708. Otherwise the connection request will be passed to its layer 2 parent node if a PCS terminal node receives the request directly from a transceiver, steps 716 and 718. In case it is not a PCS terminal node the connection request will be passed to the next node along the path to the home address of the called party, step 720. After the paging process is initiated, step 708, a connection success is reported to the system if a connection confirmation is correctly received within T seconds from the called party, steps 722 and 724. Otherwise a connection failure is reported to the system, step 726.

The following analysis gives an example to show the advantages in terms of the database memory requirement and, the updating and querying cost between the UPCS and a conventional central data base system such as the cellular system.

The Model of the example: FIG. 20 shows an example of the data base efficiency of a communication system operating in accordance with either the first or second embodiment of the present invention. The UPCS system may provide service to 100 million transceivers which are concentrated in isolated coverage areas totaling 400,000 square miles. These coverage areas may be scattered over a much larger geographical region (referred to as the spanning area), for example 4 million square miles (about the size of the U.S.A.). The system provides connectivity across the spanning area to allow transceivers located in different coverage areas to communicate.

Preferably, there are 100,000 macro cells (layer 1 nodes) each with a 4 (40) square mile coverage (spanning) area and 1,000 transceivers. There are 1,000 layer 2 nodes each with a 400 (4,000) square mile coverage (spanning) area and 100,000 transceivers for each layer 2 cell. There are 10 layer 3 nodes each with a 40,000 (400,000) square mile coverage (spanning) area and 10,000,000 transceivers in each layer 3 cell. There is one layer 4 node whose coverage (spanning) area is 400,000 (4,000,000) square miles with a population of 100,000,000 transceivers.

Suppose there is a 50 percent probability for a transceiver to be outside its layer 1 home cell (the coverage area is 4 square miles). If a transceiver is outside its layer 1 home cell it has a 10 percent probability of being outside its layer 2 home cell. If a transceiver is outside its layer 2 home cell the probability of being outside its layer 3 home cell is 2 percent.

For the communication system there are three kinds of entries in the databases.

1) Native outside: This is associated with the transceivers that registered in the cell but are currently roaming out the cell's coverage area. For layer 2 nodes there are 10,000×0.5×0.1=5,000 entries. There are 10,000,000×0.5×0.1×0.02=10,000 entries for a layer 3 node. For the layer 4 node there is no entry since the layer 4 node covers the whole interested area.

2) Foreign inside: This is associated with the transceivers inside a cell which registered outside the cell. Not losing generality, the nodes are divided into two parts. The first part is made up of the nodes inside the dashed area of FIG. 20. The second part is made up of the nodes outside the dashed area of FIG. 20. We are going to calculate the number of foreign inside entries for the part two nodes.

(I). The foreign transceivers from the first part nodes: For the layer 3 node there are 10,000,000×0.5×0.1×0.02×9/9=10,000 entries which are associated with transceivers from the dashed area. For the layer 2 nodes there are 1/100×10,000=100 entries associated with the transceivers from the dashed area.

(II). The foreign transceivers from the second part nodes: For the layer 3 node there is no such entry since there is no transceiver which is foreign to the layer 3 node and registered outside the dashed area. For the layer 2 nodes there are 100,000×0.5×0.1×(1−0.02)×99/99=4,900 entries. For the layer 4 node there is no entry associated with a foreign transceiver.

3) Native different i–1: For layer 2 nodes there are 1,000×0.5×(1–0.1)×100=45,000 such entries. For layer 3 nodes there are 100,000×0.5×0.1×(1–0.02)×100=490,000 such entries. For layer 4 node the number of such entries is 10,000,000×0.5×0.1×0.02×10=100,000.

4) The improvement in database memory requirement: Based on the above calculations, the mean total number of entries are 55,000, 510,000 and 100,000 for the layers 2, 3 and 4 nodes respectively. Compared with 100,000,000 entries required by a central database system, the maximum database capacity requirement of this system is of only 510,000/100,000,000=0.51 percent. While it is costly (if even possible) to find a computer fast enough to handle a 100 million entry database in real time for the central data base system, it is quite easy and economic to use computers handling databases of size only 0.51 percent of the central data base system. Thus, the data base for an individual node may be handled by a modern personal computer.

The total memory requirement for the present system is 60,200,000 which is only 60.2 percent of that required by a central database system. Thus the present invention significantly reduces the amount of memory necessary to maintain a data base for locating transceivers in the communication system.

The Comparison of the Updating and Querying Cost

The cost is measured as the production of the number of messages (updating or querying) and the message traveling distance. The number of messages in a layer i region is supposed to be proportional to the number of entries in the i layer node. To estimate the cost we need to estimate the mean distances between the hierarchical parent and children nodes.

1) The model used to calculate the mean message distances: FIG. 21 shows the model used to calculate the mean message distances in accordance with either the first or second embodiments of the present invention. The layer i database is assumed to be in the center of the spanning area. There are approximately $2 \times k \times \pi$ cells at a distance of $k \times D$ distance from the database. Where the D is the diameter of a layer i–1 cell.

Using this model the mean distance between a layer i database and its layer i–1 children nodes is 1.20×D, 3.74×D and 119.12×D respectively if it has 10,100, or 100,000 layer i–1 child nodes.

The diameter is calculated as two times the square root of the spanning area over pie. Thus the diameters are 7.14, 71.36 and 713.65 miles for layer 2, 3 and 4 nodes respectively. Thus the mean distance between the databases and its child nodes are 26.7, 267 and 856 miles respectively for layer 2, 3 and 4 regions.

In the same way the mean distance between the global center and its macro cell base stations for a central database system is 119.2×7.14=850 miles.

2) The improvement of updating cost: We are ready to estimate the updating and querying cost in the two different systems. The total updating cost of the present system is proportional to:

$$5,000 \times 1,000 \times 26.7 + 510,000 \times 10 \times 267 + 100,000 \times 856 = 2.916 \times 10^9$$

The total updating cost of the centralized system is proportional to:

$$100,000 \times 0.5 \times 1,000 \times 850 = 42.5 \times 10^9$$

The updating cost in the present system is 2.916/42.5= 6.86 percent of that required by the centralized system. Thus, the present system has the advantage of a significant reduction in the amount of updating required.

3) The improvement of querying cost: The number of querying messages is independent of the system architecture. It is only a function of the population and customer behavior. Assume the number of query messages (NQ) is the same for both systems.

For a central database system the querying cost is proportional to NQ×850.

For the current system the querying cost is NQ×0=0, since the databases and the switching nodes are co-located.

In summary, any active transceiver in its service area will be located using the most direct route. A location registration is realized by the transmission of M1 and M2 control messages informing the system of a moving transceiver's location. The system tries to set up a connection to the home address of the called transceiver, unless some redirecting information is found along the path to the home address of the called unit. If there is redirecting information on the called unit, its current location is indicated by the hierarchical address chain in the distributed database.

The present communication system has at least the following advantageous properties:

The system knows the exact position of an active customer as long as he/she is in one of the customer defined service areas. The connection of the calling and called parties is set up by the system using the direct path. The updating and querying cost is greatly reduced compared with the existing registration techniques. This is because: the layered system structure; macro (location area) and micro cell structure: all the active transceivers inside their home location areas (most of the transceivers are) do not need to be traced by the system; localization of the updates: the databases in the nodes at layer; and above need not to be updated for all the movements of transceivers.

The system is convenient for customers because: it is as simple as a fixed network; the home address is equivalent to the telephone number and is all that is required to call a transceiver; the customer may select mobility; the active transceivers are traced automatically by the system as long as they are in one of their service areas; the system can be built on top of the existing carrier networks and transceiver communication systems; and it is very efficient. The tracing process is realized in a layered distributed fashion with neither global paging or a global registration database. It is in fact an efficient combination of the paging and registration processes. All of these lead to the customer benefits of improved access time, lower cost, etc.

III. DESCRIPTION OF A THIRD EMBODIMENT OF THE INVENTION

FIG. 22 shows a hierarchical communication system having multiple trees in accordance with a third embodiment of the present invention. Referring back to the communication system of the second embodiment, FIG. 12, a single tree system was shown with the "EARTH" node, 510, at layer 6 being the root node of the entire system because it is the highest node in the hierarchical system of nodes. FIG. 22 shows a communication system having three trees, each tree having a root node at layer 4. The Georgia tree 800–816 has a root node, 800, at layer 4, and hierarchical tree descending to area code nodes, 802 and 804 at layer 3, city nodes 806 and 808 at layer 2 and PCS ports 810 and 812. Note that as in the second embodiment, a cellular port 814, and an aircraft port 816 are included in the tree to allow multiple modes of communication in accordance with the second embodiment of the invention. Similarly, FIG. 22 shows a portion of a Florida tree 820–830 having hierarchical nodes 820–824 and corresponding PCS, 826, air craft 828, and cellular 830, ports. Similarly, a root node 835 of a California tree is show. Even though FIG. 22 shows all root nodes being at level 4, this is not a limitation of the invention. For example, at a given point in time, the communication may develop to have a U.S.A. root node at level 5, an Ontario root node at level 4, and a Mexico City root node at level 3.

Each of the root nodes, 800, 820 and 835 is shown to be coupled the other root nodes in order that a call between a customer at one tree may be made to a customer at another tree. The coupling between the root nodes may be accomplished with the lines of the existing public switch telephone network (PSTN) or via special satellite, fiber optic or microwave link. By providing a means for completing calls in a system having multiple trees, the advantages of a communication system of either the first or second embodiments may be realized first in a system of small local trees, which expands as the system expands by the addition of more layers as more coverage infrastructure is provided. As the system expands, root nodes of smaller trees may be joined in a larger tree by a higher layer root node. The linking of the root nodes of the various trees as provided for in this third embodiment without a higher layer node, enables the establishment and growth of the system without requiring initial establishment of all of the layers of the first two embodiments.

FIG. 22 also shows a transceiver 840 moving from a PCS port 826 of the Florida tree to a PCS port 810 of the Georgia tree. Similar to the second embodiment, the system uses M1, M2, M3, and M4 messages, however the response by a node or port is somewhat different in the third embodiment.

As in the first two embodiments, the ports (including the layer 1 nodes 826, 810 and 812) in the communication system are required to broadcast system information regularly or on demand. The port ID (address) is part of the system information. The active transceivers are required to lock to the strongest port. A transceiver is said to lock to a port, among other requirements, if it is synchronized to the port and has the knowledge of the port ID (address). The ID of a port to which a transceiver is locking, serves as the physical address (current address and new address) of the transceiver. With the knowledge of the address of the port to which the transceiver is locking, a boundary crossing is easily detected. For example a layer i boundary is crossed if i is the highest layer where the current and the new addresses received by the transceiver are different.

A transceiver will transmit a M1, M3, or M4 message to the new or current ports. The new and current port are the same for a transceiver unless it is in a handover process. In a handover process a new port is the port that the transceiver is going to lock to and the current port is the port that the transceiver is locking to. The transmission of a M1 message is used to inform the system that a handover is triggered for a transceiver and the new port is to couple to the transceiver. The transmission of a M3 message is used to inform the system that the transceiver is getting out of the system, either going out of the covered area of the system or simply turning off the power of the transceiver. A transceiver will transmit a M4 message to the port which it is locking. This informs the system that the transceiver is getting into the system either by moving into the covered area of the system with the transceiver power on, or by a user turning on the power of the transceiver inside the covered area of the system. The M2 messages are not transmitted directly by the transceivers, but are used by the system to conserve memory. For details see the second embodiment. The INc and INn is true if the current or new respective address of the transceiver is inside one of the service areas chosen by the customer. Cnc(i), Cnh(i), Cch(i), Ccn*(i), Cnn*(i) are true if the new, new, current, current, and new respective address and the current, home, home, current node, and current node respective address are the same at layer i and false otherwise. Requirements for transmission by a transceiver of M1, M3 and M4 messages may be logically represented:

```
CASE
BEGIN
    INc & INn & not Cnc(1):           Send M1 to new port:
    not Cch(1) & [(INc & Turn_off) or (INc & not INn) or
unsuitable usage]:
                                      Send M3 to current port;
    not Cnh(1) & [(INc & Turn_on) or (INn & not INc):
                                      Send M4 to new port;
END
```

The flowchart of FIG. 23 shows the response of the nodes and ports in the communication system operating in accordance with the third embodiment of the present invention to a M1 message. The Rnc (Rch, Rhn) is the highest layer where the new (current, home) address and the current (home, new) address are different. The communication type is the indication of which subsystem (personal, cellular or air phone) the transceiver is currently in. The number of the highest layer or root node in a tree is defined to be I. By introducing I and the communication type, any combination of tree structures may be accommodated.

Referring to FIG. 23, a M1 message is received at step 850 and a value "K" is set to "0" at step 852. When a port of layer 1 receives a M1 message, it sends a M1 message to its layer 2 node and the process stops, steps 854, 856 and 858. Otherwise, if the node is in layer 2 or above, it checks if it is on its upward updating path in a hierarchical chain, steps 860 and 862. If it is on the top of the path, a M2 message will be sent to layer i−1 of the current address, step 864. If it is an upward path, and if not at the root node, step 866 then a M1 message will be sent to layer i+1, step 868. If i=I (root node), step 866, and if Cnn*(i) is false, step 870, and Ccn*(I) is true, step 872, then the variable K is set to one, and a M2 message is sent to layer i−1 of the current address, step 874. Otherwise, if Ccn*(I) is false, the pointer is set to a new root node, step 876, and the process stops, step 858. If Cnn*(i) is true, step 870, and Cnh(I) is false, step 878, then a M1 message is sent to the root node of the home tree, step 879. Then from either step 878 or 879, if Cch(I) is false, step 880, a M2 message is sent to the current root node, step 882. Step 890 is entered from either step 864, 868, 874, 880 or 882 where the node memory is checked for an entry associated with the transceiver. If not, and K=1, step 892 then an entry is added with identification of the new root node, step 894. Otherwise, K=0 and the transceiver entry is added without identification of the root node, step 896. If the node has a transceiver entry, step 890, and Cnh(i−1) is false, step 898, and K=1, step 900 then a pointer is added to indicate the new root node step 902. Otherwise, if K=0, step 900, then the address in memory is changed correspondingly, step 904. If Cnh(i−1) is true, step 898, and the transceiver is not a PCS type and i=com.type, step 906, then the HERE mark is set step 908. Otherwise, the transceiver entry is deleted from memory, step 910, thereby conserving memory in the node. The process then stops at step 858.

The operation of the M2 message is described with respect to the second embodiment and FIG. 16.

The flowchart of FIG. 24 shows the response of the nodes and ports in the communication system operating in accordance with the third embodiment of the present invention to a M3 message. A M3 message is received at step 920, and if i=1, step 922, the M3 message is sent to layer 2 at step 924. If i≠1, step 922, then the transceiver entry is deleted from the memory of the node, step 926. If Rch≠1, step 928, and Ccn*(i) and i≤Rch, step 930 then a M3 message is sent to layer i+1, step 932. If Rch=1, step 928, and Ccn*(i) and i<Rch, step 934 then the M3 message is also sent to layer i+1. Otherwise, from steps 930 or 934, if i=I and not Chn*(i), step 938, then a M3 message is sent to the root node of the home tree of the transceiver, step 940. Otherwise, from step 938, if Chn*(i) and i>2, then a M3 message is sent to layer i−1 of the home address. Finally, from either step 924, 932, 936, 940, 942 or 944, the process stops at 946.

The flowchart of FIG. 25 shows the response of the nodes and ports in the communication system operating in accordance with the third embodiment of the present invention to a M4 message. When a node receives a M4 message, step 950, if the message is received at a node coupled to a port coupled to the transceiver step 952, an authentic test is performed, step 954. If the transceiver is not qualified to use the current subsystem the request is rejected and the process stops, step 956. Otherwise the following functions are performed. If received at level 1, step 960, it sends a M4 message to its layer 2 node, step 962, and the process stops, step 956. If Chn*(i) is false, step 964, and i=I, step 966, then a M4 message is sent to the home root node, step 968. If i≠I then a M4 message is sent to layer i+1 at step 970, and from there or step 968, the transceiver entry is added to memory, step 972. However, if Chn*(i) is true, step 964, and i≠2, step 974, then a M4 message is sent to layer i−1 of the home address, step 976. From either step 974 or 976, if i=Rhn+1, step 978, then the transceiver entry is added to memory with the i−1 layer address, step 980. Otherwise, if i=I, step 982, then the transceiver entry is added to the node memory with the root address being equal to the current root node, step 984. Otherwise, if Chn(i), and the transceiver is not a PCS type and i=com.type, step 986 then the transceiver entry is added to memory and the HERE mark is set, step 988. Otherwise, if Chn(i) and i=com.type is false, step 990, the transceiver entry is added to the node memory and the OUT mark is set, step 992. Finally, from either step 972, 980, 984, 988, 990 or 992, the process stops at step 956.

The following example illustrates how the system works after receiving a M1 message from a transceiver of class j>I=4, such as transceiver 840 of FIG. 22. Class j>I means the customer wants to be reached outside the covered area of the home root node of the transceiver, the areas where the customer wants to be reached is defined by the service areas chosen by the customer. For simplicity, assume the customer is always active inside a service area.

If transceiver 840 is registered somewhere in California, by having a California home address, and the transceiver has a current address in Florida, "904", Jacksonville, and PCS port 826 and is moving into a new address of PCS port 810, thereby by having an new address of Georgia, "912", Savannah, PCS port 810, then by definition the Rnc=I=4.

There is already an address chain for the transceiver in the system in the Florida tree, and port 826 is coupled to the transceiver. There are all OUT marks in the associated entries in the nodes of layer three and two on the path rooted at the node California leading to the home address of the transceiver. There is an entry associated with the transceiver in the database of the root node California 835 indicating that the transceiver is in the covered area and coupled to a port of the root node Florida, 820. In the node Florida, 820, there is an entry associated with the transceiver indicating that the transceiver is currently at area code "904" node, 822.

The same way in the area code node "904" there is an entry pointing to the Jacksonville node, 824, and in the node Jacksonville there is an entry pointing to the PCS port, 826.

A M1 message will be transmitted by the transceiver to the PCS port, 810, when the boundary is crossed. After the PCS port receives the M1 message, it will couple to the transceiver and will transmit a M1 message to the layer two parent node Savannah, 806. Receiving the M1 message, the node Savannah will transmit a M1 message to its parent area code "912" node, 802, and add a new entry for that transceiver indicating that the transceiver is currently in the covered area of one of its layer i−1 child nodes. This process repeats in nodes "912", 802. When node Georgia, 800, receives the M1 message it will transmit the M1 message to the home root node, California, 835, and a M2 message to the current root node, Florida, 820. When the home root node receives the M1 message it just changes its pointer from Florida to Georgia. Thus, the address chain is updated corresponding to the handover of the transceiver from a PCS port 826 of the Florida tree to a PCS port 810 of the Georgia tree. The rest is to remove the existing address chain from the Florida tree, from node Florida, 820, down to the PCS port, 826, which is performed by the process of a node receiving an M2 message.

The process performed by a node receiving a M2 message has been described in the second embodiment with respect to FIG. 16. After receiving the M2 message from the node Georgia, 800, the node Florida, 820, will send a M2 message to its layer i−1 child node "904", 822, along the path leading to the current address of the transceiver and the associated entry is deleted from the database memory of the node. In the same way the nodes "904", 822, and Jacksonville, 824, delete the associated entries of the transceiver in their database memories. Thus, the process of updating the address chain associated with the moving transceiver is finished, and all information associated with the transceiver 840 has been removed from nodes in the Florida tree.

The process performed by a node after receiving a M3 message is defined in FIG. 24. After receiving a M3 message from an active transceiver the system will remove the entire address chain associated with the transceiver. As an example and referring again to FIG. 22, a transceiver, 840, this time with a home address of Florida, "904", Jacksonville, and PCS port, 826, and a current address of Georgia, "912", Savannah, and PCS port, 810, has its power turned off. A M3 message is transmitted to the PCS port, 810. Receiving the M3 message the PCS port, 810, will report the event to its parent node Savannah, 806. The node Savannah, 806, then will transmit the M3 message to its parent node "912", 802, and remove the associated entry of the transceiver from its memory. In the same way the nodes "912", 802, and Georgia, 800, will remove the associated entries of the transceiver in their databases and the node Georgia, 800, will send a M3 message to the home root node, Florida, 820, of the transceiver. Receiving the M3 message, the node Florida, 820, will send a M3 message to its layer i−1 child node on the path leading to the home address of the transceiver and the associated entry of the transceiver is removed from the database memory of the node Florida, 820. In the same way the nodes "904", 822, and Jacksonville, 824, will remove the associated entries in their database memories. In this way the address chain removing process associated with a transceiver moving out of the system is finished.

The process performed by a node receiving a M4 message is described with respect to FIG. 25. Basically the system is to setup an address chain that locates the transceiver that transmits the message. Referring again to FIG. 22 as well as FIG. 25 generally, a transceiver, 840, with a home address of Florida, "904", Jacksonville, and PCS port, 826, turns its power on inside a cell causing a new address of Georgia, "912", Savannah, PCS port, 810. This leads to a M4 message to be transmitted to the PCS port, 810. The PCS port, 810, will transmit the M4 message to its layer two parent node Savannah, 806. Receiving the M4 message, the node Savannah, 806, will make an authentic test and will send the M4 message to its layer i+1 parent node "912", 802. An entry will be added in its database memory indicating the current layer i−1 address of the transceiver. In the same way entries with correct layer i−1 address are added in the database memories of the nodes "912", 802, and Georgia, 800. Receiving the M4 message, the node Georgia, 800, will send the M4 message to Florida, 820, the home root node of the transceiver. The node Florida, 820, will send the M4 message to its layer i−1 child node "904", 822, along the path leading to the home address port of the transceiver. An entry indicating that the transceiver, 840, is currently in the coverage area and coupled to a port of a root node Georgia, 800, is added in the database of the node Florida, 820. Receiving the M4 message, the node "904", 822, will send the M4 message to the node Jacksonville, 824, and an entry with an OUT mark is added in its database memory. In the same way an entry with an OUT mark associated with the transceiver is added in the database of the node Jacksonville, 824. Thus, an entire address chain is built for the transceiver.

A connection request (CON_REQ) message is transmitted to the system if a calling party initiates a call. The process for a layer i node receiving a CON_REQ is defined in FIG. 19 of the second embodiment. No substantial change is made in the third embodiment compared with the second embodiment as far as the process of receiving a CON_REQ is concerned. The system basically forwards the connection to the called party's home address if no information is available in the nodes on the direct path leading to the home address of the called party. If such information is found in at least one node on the journey, the system will then direct the connection following the address chain. As an example, referring again to FIG. 22 and FIG. 19 generally, a calling party, say a transceiver, currently at PCS port, 812, wants to talk to the customer described in the previous example with a home address of Florida, "904", Jacksonville, and PCS port, 826, and a current address of Georgia, "912", Savannah, and PCS port, 810. In this example, the calling party has no knowledge of the current address of the called party. The calling party transmits a CON_REQ with the home address of the called party as the receiver ID to the PCS port, 812. The PCS port, 812, will transmit the request to the node Athens, 808. Since there is no information associated with the called party, the node Athens, 808, will transmit the request to the next node "404", 804, along the direct path to the called party's home address. The process proceeds until the node Georgia, 800, is reached where the information about the called party is found. Then the connection is directed by the found address chain from the node Georgia, 800, down to the PCS port 810 the current address of the called party. The PCS port, 810, sends the CON_REQ to the transceiver, 840, and the called party is found.

An example showing that the Florida node, 820, and the Georgia node, 800, do not have a hierarchical relationship would be if a first transceiver having a Florida home address where operating within the Georgia tree, while a second transceiver having a Georgia home address were operating in the Florida tree. In the third embodiment, the Florida root node 820 would have an entry associated with the first transceiver and pointing to the Georgia root node 800. Similarly the Georgia root node 800 would have an entry associated with the second transceiver and pointing to the Florida root node, 820. Since nodes 800 and 820 are root nodes, they may have pointer pointing to each other. Thus, the nodes are not hierarchically related. However, in the first and second embodiments, the above pointers would be located at a higher level "U.S.A." node. Therefore, higher level nodes need not be established in the third embodiment because various level root nodes may communicate with each other.

Numerous variations of examples may be made while keeping within the operations described by the figures and flowcharts. The third embodiment allows, communications systems such as a personal communication systems (PCS) having a hierarchy of nodes to co-exist with existing communication systems during its establishment. The third embodiment allows the complete hierarchy of nodes including national and global nodes to be established at any time introduction of a system system of multiple trees of hierarchical nodes. Thus, what is provided is a method for connecting calls between developed hierarchical trees of the communication system when the trees are not related by hierarchical nodes.

I claim:

1. A method of locating a portable transceiver in a communication system having a multiplicity of ports for transferring communication information through the communication system between a plurality of transceivers, the portable transceiver being a member of the plurality of transceivers, each of the plurality of transceivers being coupled to one of the multiplicity of ports, a multiplicity of nodes for transferring information between the multiplicity of ports, each of the multiplicity of ports coupled to one of the multiplicity of nodes, each of the multiplicity of nodes having memory capable of storing data indicative of a port to which the portable transceiver is coupled, and a plurality of node trees comprising the multiplicity of ports and the multiplicity of nodes, each of the plurality of node trees having a plurality of the multiplicity of ports, and a plurality of the multiplicity of nodes structured as a hierarchical system of nodes, wherein a root node is structured as a highest node in the hierarchical system of nodes, wherein the plurality of node trees includes a home tree associated with the portable transceiver, the portable transceiver having an address indicative of a home port of the home tree, and the plurality of node trees further includes a second tree having a second port, the method comprising the steps of:

(a) coupling the second port to the portable transceiver; and (b) adding a first data entry to a root node of the home tree in response to step (a) of coupling, the first data entry being associated with the portable transceiver and indicative of a root node of the second tree.

2. The method according to claim 1 further comprising the steps of:

(c) determining a second node of the second tree to be a member of a hierarchical chain of nodes indicative of the second port in response to step (a) of coupling;

(d) adding a second data entry to the second node in response to step (c) of determining, the second data entry being associated with the portable transceiver and indicative of the second port;

(e) determining a third node of the home tree to be a member of a hierarchical chain of nodes indicative of the home port; and (f) adding a third data entry to the third node in response to step (e) of determining, the third data entry being associated with the portable transceiver and indicative of an absence the portable transceiver from a port of the home tree.

3. The method according to claim 2 wherein the plurality of trees further includes a third tree having a third port, and the method further includes:

(g) coupling the third port to the portable transceiver;

(h) adding a fourth data entry to the root node of the home tree in response to step (g) of coupling, the fourth data entry being associated with the portable transceiver and indicative of a root node of the third tree; and (i) deleting the first data entry from the root node of the home tree in response to step (g) of coupling.

4. The method according to claim 3 further comprising the steps of:

(j) determining a fifth node of the third tree to be a member of a hierarchical chain of nodes indicative of the third port; and (k) adding a fifth data entry to the fifth node in response to step (j) of determining, the fifth data entry being associated with the portable transceiver and indicative of the third port coupling to the portable transceiver; and (l) deleting the second data entry from the second node in response to step (j) of coupling.

5. The method according to claim 2 further comprising the steps of:

(m) coupling a port of the home tree to the portable transceiver;

(n) deleting the first data entry from the root node of the home tree in response to step (m) of coupling; and (o) deleting the second data entry from the second node in response to step (m) of coupling.

6. The method according to claim 5 further wherein the port of the home tree is the home port and the method further comprises the step of:

(p) deleting the third data entry from the third node in response to step (m) of coupling.

7. A method of locating a plurality of portable transceivers in a communication system having a multiplicity of ports for transferring communication information through the communication system between the plurality of portable transceivers, each of the plurality of portable transceivers being coupled to one of the multiplicity of ports, a multiplicity of nodes for transferring information between the multiplicity of ports, each of the multiplicity of ports uniquely coupled to one of the multiplicity of nodes, each of the multiplicity of nodes having memory capable of storing data indicative of a port to which at least one of the plurality of portable transceivers is coupled, and a plurality of node trees comprising the multiplicity of ports and the multiplicity of nodes, each of the plurality of node trees having a plurality of the multiplicity of ports, and a plurality of the multiplicity of nodes structured as a hierarchical system of nodes, wherein a root node is structured as a highest node in the hierarchical system of nodes, wherein the plurality of node trees includes a first home tree associated with a first portable transceiver, the first portable transceiver having a first address indicative of a first home port of the first home tree, and the plurality of node trees further includes a second home tree associated with a second portable transceiver, the second portable transceiver having a second address indicative of a second home port of the second home tree, and the method further comprising the steps of:

(a) coupling a third port of the second home tree to the first portable transceiver;

(b) adding a first data entry to a root node of the first home tree in response to step (a) of coupling, the first data entry being associated with the first portable transceiver and indicative of a root node of the second tree;

(c) coupling a fourth port of the first home tree to the second portable transceiver; and (d) adding a second data entry to a root node of the second home tree in response to step (c) of coupling, the second data entry being associated with the second portable transceiver and indicative of a root node of the first tree.

8. The method according to claim 7 further comprising the steps of:

(e) determining a third node of the second tree to be a member of a hierarchical chain of nodes which is indicative of the third port;

(f) adding a third data entry to the third node in response to step (e) of determining, the third data entry being associated with the first portable transceiver and indicative of the third port;

(g) determining a fourth node of the first tree to be a member of a hierarchical chain of nodes which is indicative of the fourth port; and (f) adding a fourth data entry to the fourth node in response to step (g) of determining, the fourth data entry being associated with the second portable transceiver and indicative of the fourth port.

9. The method of claim 8 wherein the first address is included within the first data entry and the third data entry, thereby associating the first data entry and the third data entry with the first portable transceiver, and further wherein the the second address is included with the second data entry and the fourth data entry, thereby associating the second data entry and the fourth data entry with the second portable transceiver.

10. A method of completing a call to one of a plurality of a transceivers in a communication system having a multiplicity of ports for transferring communication information through the communication system between the plurality of transceivers, each of the plurality of transceivers being coupled to one of the multiplicity of ports, a multiplicity of nodes for transferring information between the multiplicity of ports, each of the multiplicity of ports uniquely coupled to one of the multiplicity of nodes, each of the multiplicity of nodes having memory capable of storing data indicative of a port to which the one of the plurality of transceivers is coupled, and a plurality of node trees comprising the multiplicity of ports and the multiplicity of nodes, each of the plurality of node trees having a plurality of the multiplicity of ports, and a plurality of the multiplicity of nodes structured as a hierarchical system of nodes, wherein a root node is structured as a highest node in the hierarchical system of nodes, wherein the plurality of node trees includes a home tree associated with the one of the plurality of transceivers, the one of the plurality of transceivers having an address indicative of a home port of the home tree, and the plurality of node trees further includes a second tree having a second port, the method comprising the steps of:

(a) receiving a connection request at the second port, the connection request intended for reception by the one of the plurality of transceivers;

(b) forwarding the connection request from the second port to a root node of the second tree;

(c) determining an absence of a data entry associated with the one of the plurality of transceivers at the root node of the second tree; and (d) forward the connection request from the root node of the second tree to a root node of the home tree in response to step (c) of determining.

11. The method according to claim 10 further comprising the step of:

(e) forwarding the connection request from the root node of the home tree to the home port in response to an absence of a data entry associated with the one of the plurality of transceivers from any node in the home tree.

12. The method according to claim 10 further wherein the plurality of node trees includes a third tree, and the method further includes the step of:

(f) determining the presence of a data entry associated with the one of the plurality of transceivers at the root node of the home tree, the data entry being indicative of the one of the plurality of transceivers coupling to a port of the third tree; and (g) forwarding the connection request from the root node of the home tree to a root node of the third tree in response step (f) of determining.

13. The method according to claim 12 further comprising the step of:

(h) forwarding the connection request to the third port in response to step (g) of forwarding.

14. A method of completing a call to a transceiver of a plurality of transceivers in a communication system having a multiplicity ports for transferring communication information through the communication system between the plurality of transceivers, each of the plurality of transceivers being coupled to one of the multiplicity of ports, a multiplicity of nodes for transferring information between the multiplicity of ports, each of the multiplicity of ports uniquely coupled to one of the multiplicity of nodes, each of the multiplicity of nodes having memory capable of storing data indicative of a port to which the transceiver is coupled, and a plurality of node trees comprising the multiplicity of ports and the multiplicity of nodes, each of the plurality of node trees having a plurality of the multiplicity of ports, and a plurality of the multiplicity of nodes structured as a hierarchical system of nodes, wherein a root node is structured as a highest node in the hierarchical system of nodes, wherein the plurality of node trees includes a home tree associated with the transceiver, the transceiver having an address indicative of a home port of the home tree, and the plurality of node trees further includes a second tree having a second port, the method comprising the steps of:

(a) receiving a connection request at a port of the home tree, the connection request intended for reception by the transceiver;

(b) determining the presence of a data entry associated with the transceiver at a node in the home tree, the data entry being indicative of an absence of the transceiver from a port of the home tree;

(c) forwarding the connection request to a root node of the home tree in response to step (b) of determining;

(d) determining the presence of a data entry associated with the transceiver at the root node of the home tree, the data entry being indicative of a port of the second tree coupling to the transceiver; and (e) forwarding the connection request from the root node of the home tree to a root node of the second tree in response to step (d) of determining.

15. A communication system for completing a call to a transceiver of a plurality of transceivers, the communication system comprising:

a multiplicity ports for transferring communication information through the communication system between the plurality of transceivers, each of the plurality of transceivers being coupled to one of the multiplicity of ports;

a multiplicity of nodes for transferring information between the multiplicity of ports, each of the multiplicity of ports uniquely coupled to one of the multiplicity of nodes, each of the multiplicity of nodes having memory capable of storing data indicative of a port to which the transceiver is coupled; and a plurality of node trees comprising the multiplicity of ports and the multiplicity of nodes, each of the plurality of node trees having a plurality of the multiplicity of ports, and a plurality of the multiplicity of nodes structured as a hierarchical system of nodes, wherein a root node is structured as a highest node in the hierarchical system of nodes, wherein the plurality of node trees includes a home tree associated with the transceiver, the transceiver having an address indicative of a home port of the home tree, and the plurality of node trees further includes a second tree having a second port, wherein a connection request is received at a port of the home tree, and intended for reception by the transceiver, and if the presence of a data entry associated with the transceiver is at a node in the home tree indicative of an absence of the transceiver from a port of the home tree, then the connection request is forwarded to a root node of the home tree in response thereto, and if the presence of a data entry associated with the transceiver at the root node of the home tree is indicative of a port of the second tree coupling to the transceiver, then the connection request is forwarded from the root node of the home tree to a root node of the second tree.

* * * * *